(12) United States Patent
Nishimoto

(10) Patent No.: US 9,669,711 B2
(45) Date of Patent: Jun. 6, 2017

(54) POWER TAKE-OFF UNIT

(71) Applicant: Kanzaki Kokyukoki Mfg. Co., Ltd., Amagasaki-shi, Hyogo (JP)

(72) Inventor: Shuji Nishimoto, Amagasaki (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 188 days.

(21) Appl. No.: 14/445,982

(22) Filed: Jul. 29, 2014

(65) Prior Publication Data

US 2015/0045184 A1 Feb. 12, 2015

Related U.S. Application Data

(60) Provisional application No. 61/864,339, filed on Aug. 9, 2013.

(51) Int. Cl.
| | |
|---|---|
| *B60K 23/08* | (2006.01) |
| *B60W 10/02* | (2006.01) |
| *B60W 10/119* | (2012.01) |
| *B60K 17/344* | (2006.01) |

(52) U.S. Cl.
CPC ............ *B60K 23/08* (2013.01); *B60K 17/344* (2013.01); *B60W 10/02* (2013.01); *B60W 10/119* (2013.01); *Y10T 477/6394* (2015.01)

(58) Field of Classification Search
CPC .............. B60W 10/14; B60W 10/119; B60W 2023/0816; B60W 2023/0825; B60W 10/182; B60W 2510/188; B60K 17/346; B60K 2023/0816; B60K 2023/0825; Y10T 477/6394; Y10T 477/745; Y10T 477/649; F16D 63/006

USPC ........................................ 477/171; 192/219.4
See application file for complete search history.

(56) References Cited

U.S. PATENT DOCUMENTS

| | | | | |
|---|---|---|---|---|
| 5,901,817 A | * | 5/1999 | Gitnes ................... | F16D 43/206 188/134 |
| 6,877,573 B2 | * | 4/2005 | Hasegawa ............... | F16D 55/40 180/24.01 |
| 2005/0279607 A1 | * | 12/2005 | Fusegi .................. | F16D 27/118 192/84.96 |
| 2009/0255746 A1 | * | 10/2009 | Boesch ................... | B60K 6/365 180/197 |
| 2010/0072021 A1 | * | 3/2010 | Kingston ............. | B60K 17/346 192/218 |
| 2010/0094519 A1 | * | 4/2010 | Quehenberger ....... | B60K 17/35 701/69 |

(Continued)

*Primary Examiner* — Stacey Fluhart
(74) *Attorney, Agent, or Firm* — Sterne, Kessler, Goldstein & Fox P.L.L.C.

(57) ABSTRACT

A power take-off (PTO) unit takes-off power from a transmission for driving a first drive wheel of a vehicle and transmits the taken-off power to a second drive wheel of the vehicle. The PTO unit includes a PTO casing, a PTO shaft and a brake for braking the PTO shaft. The PTO casing is mounted on another casing incorporating the transmission. The PTO shaft is journaled by the PTO casing, drivingly connected to the transmission shaft of the transmission and drivingly connected to the second drive wheel. The brake is disposed in the PTO casing. The brake includes an unslidable pawl that is not slidable axially in the axial direction of the PTO shaft, and includes a slidable pawl that is slidable axially in the axial direction of the PTO shaft so as to selectively engage or disengage with and from the unslidable pawl.

9 Claims, 11 Drawing Sheets

(56) References Cited

U.S. PATENT DOCUMENTS

| | | | | |
|---|---|---|---|---|
| 2011/0127100 A1* | 6/2011 | Ahlberg | ............ | B60K 23/0808 |
| | | | | 180/245 |
| 2014/0144719 A1* | 5/2014 | Morgan | .................. | B60K 1/00 |
| | | | | 180/65.31 |
| 2014/0291109 A1* | 10/2014 | Mitsubori | ............... | B60T 1/005 |
| | | | | 192/219.4 |

* cited by examiner

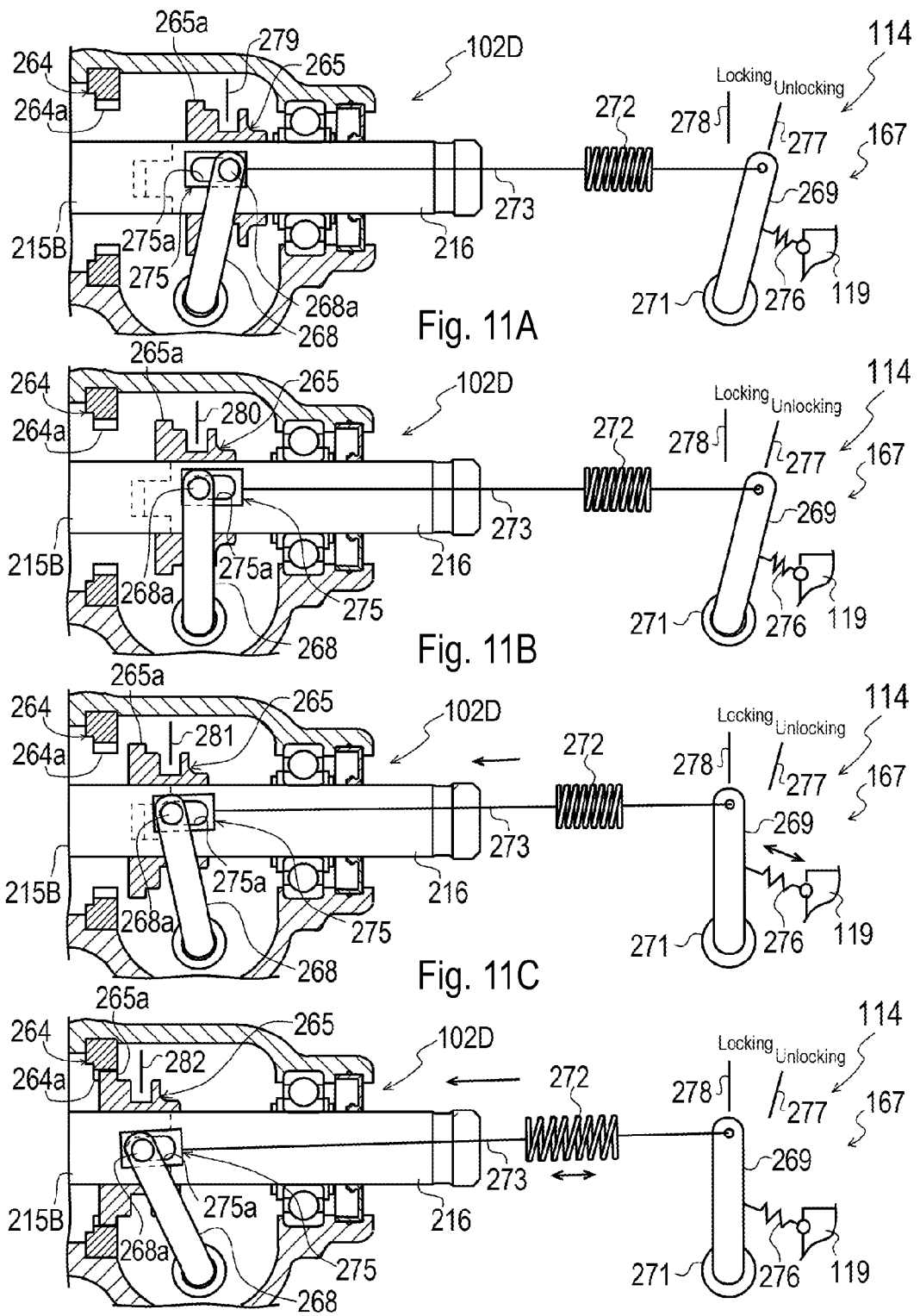

POWER TAKE-OFF UNIT

CROSS-REFERENCE TO RELATED APPLICATIONS

The present application claims the benefit of priority to U.S. Provisional Patent Application No. 61/864,339, filed on Aug. 9, 2013, which is hereby incorporated by reference in its entirety.

BACKGROUND OF THE INVENTION

Field of the Invention

The present invention relates to a power take-off (hereinafter referred to as "PTO") unit for a four-wheel drive vehicle, more specifically, a PTO unit that takes-off power from a transmission driving either front or rear wheels and outputs the taken-off power to the other front or rear wheels.

Related Art

A utility vehicle as disclosed by JP 2008-95711 A serves as a conventional four-wheel drive vehicle. This four-wheel drive vehicle is equipped with a prime mover, e.g., an engine, a first transaxle for driving either front or rear wheels, and a second transaxle for driving the other front or rear wheels. The first transaxle includes a transaxle casing incorporating a transmission, e.g., a gear transmission, for transmitting power from the prime mover to the corresponding front or rear wheels, and a PTO unit is mounted on the transaxle casing of the first transaxle so as to take-off power from the transmission of the first transaxle and so as to output the taken-off power to the second transaxle.

In this regard, the first transaxle includes an input shaft of the transmission projecting outward from one right or left side portion of the transaxle casing of the first transaxle, and another transmission, e.g., a belt transmission, is provided on this right or left side portion of the transaxle casing so as to transmit power from the prime mover to the input shaft. The PTO unit is mounted on the other right or left side portion of the transaxle casing opposite the input shaft in the lateral direction of the vehicle because the PTO unit can be designed to orient its PTO shaft in various directions freely from the input shaft and the other transmission on the opposite side of the first transaxle.

The transaxle casing of the first transaxle supports right and left differential yoke shafts drivingly connected to the corresponding wheels and provided with respective disc brakes. Each disc brake includes fixed discs fixed to the transaxle casing and rotatable discs rotatably integrated with the corresponding differential yoke shaft. These disc brakes are operatively connected to a brake pedal equipped on the vehicle so as to serve as foot brakes.

The capacities of the foot brakes have to be limited because increasing the capacities of the foot brakes means expansion of the discs against the desired minimizing and lightening of the vehicle. However, such limited capacities of the foot brakes may cause insufficient braking forces of the foot brakes for surely keeping the vehicle braked or parked on a slope from unexpectedly descending the slope, especially when the vehicle is heavily loaded or is on a steep slope.

To supplement the braking force, one conceivable solution is to additionally provide a parking brake on the vehicle. Disc brakes or drum brakes provided in rims of the wheels or on hubs of the wheels serve as typical parking brakes. However, such brakes have parts exposed to the outside of the vehicle, so that the exposed parts are likely to be wetted or covered by water or mud so as to impair the braking performance of the parking brakes.

SUMMARY OF THE INVENTION

An object of the invention is to provide a stable and effective means for additionally braking wheels of a four-wheel drive vehicle.

To achieve the object, a PTO unit according to the invention is adapted to take-off power from a transmission for driving a first drive wheel of a vehicle and to transmit the taken-off power to a second drive wheel of the vehicle. The PTO unit comprises a PTO casing, a PTO shaft, and a brake. The PTO casing is mounted on another casing incorporating the transmission. The PTO shaft is journalled by the PTO casing, is drivingly connected to a transmission shaft of the transmission and is drivingly connected to the second drive wheel. The brake is disposed in the power take-off casing. The brake includes an unslidable pawl that is not slidable in the axial direction of the PTO shaft, and the brake includes a slidable pawl that is slidable in the axial direction of the power take-off shaft so as to be shiftable between a braking position where the slidable pawl engages with the unslidable pawl so as to brake the PTO shaft and an unbraking position where the slidable pawl disengages from the unslidable pawl so as to unbrake the PTO shaft.

The PTO unit has the following advantages: The brake including the slidable and unslidable pawls can have a great capacity of braking the PTO shaft so as to apply its braking force to both the first and second drive wheels of the vehicle, thereby surely stopping or parking the vehicle even if the vehicle is on a slope (and carries a heavy load). Especially, if the vehicle equipped with the PTO unit is provided with other brakes, e.g., disc brakes or drum brakes, for braking the respective first and second wheels and uses the brake of the PTO unit as a parking brake, the brake of the PTO unit and the other brakes bring the vehicle to their great braking effect. Further, for the benefit of providing a compact and light vehicle, the other brakes can be kept compact due to the assistance of the brake of the PTO unit for braking or parking the vehicle, and the PTO unit can be compact because the brake of the PTO unit is compactly accommodated in the PTO casing. The brake of the PTO unit can have a long life because it is protected by the PTO casing from water or mud in comparison with the other brakes such as disc brakes or drum brakes that are usually exposed to water or mud. Further, the PTO casing of the PTO unit can be optionally mounted to the casing of the transmission. The only requirement to design a vehicle having only the first wheel driven by the transmission (meaning a two-wheel drive vehicle) and having no parking brake is to provide the vehicle without the PTO unit. Alternatively, the PTO unit may be optionally provided without the brake in the PTO casing so that the vehicle provided with this optional PTO unit has both the first and second drive wheels driven by the transmission (meaning a four-wheel drive vehicle) and has no parking brake.

Preferably, the PTO shaft includes an upstream shaft part and a downstream shaft part. The PTO unit further comprises a clutch interposed between the upstream and downstream shaft parts so that the clutch is selectively engaged for drivingly connecting the upstream shaft part to the downstream shaft part or disengaged for isolating the downstream shaft part from the rotary power of the upstream shaft part. The brake is configured to brake the upstream shaft part when the slidable pawl is disposed at the braking position.

Therefore, the clutch enables the selection whether the vehicle equipped with the PTO unit having the clutch travels by driving both the first and second drive wheels or by driving only the first drive wheel depending on whether the clutch is engaged or disengaged. The brake having the slidable pawl disposed at the braking position surely brakes the first drive wheel because it brakes the upstream shaft part of the PTO shaft drivingly connected to the first drive wheel via the transmission regardless of whether the clutch is engaged or disengaged.

Preferably, the clutch and the brake are configured so that the clutch is engaged when the slidable pawl of the brake is disposed at the braking position.

Therefore, even if the clutch is disengaged so as to set the vehicle to travel with only the first drive wheel driven by the transmission, once the brake is operated to have the slidable pawl at the brake position, the clutch is forcibly engaged to set the vehicle to travel with both the first and second drive wheels driven by the transmission, so that the engaged clutch transmits the braking effect of the brake to the downstream shaft as well as the upstream shaft part, thereby applying the braking effect to both the first and second drive wheels, and thereby surely and swiftly braking or parking the vehicle.

Preferably, at least one of the first and second drive wheels is paired and a differential unit differentially connects the pair of first or second drive wheels to each other. The differential unit is provided with a differential locker that is shiftable between a locking state to rotatably integrate the pair of first or second drive wheels with each other and an unlocking state to allow differential rotation of the pair of first or second drive wheels.

Therefore, by setting the differential locker in the unlocking state, the pair of first or second drive wheels are differentially rotatable so as to ensure the smooth turn of the vehicle. On the other hand, by setting the differential locker in the locking state, the pair of first or second drive wheels are rotatably integrated with each other so as to improve the off-road traveling performance of the vehicle traveling on a rough, soft or muddy ground in comparison with the unlocking state of the differential locker where the vehicle may be stuck in a mud or depression because one of the pair of drive wheels falling in the mud or depression receives the most of output power of the differential unit to merely idle and the other of the pair of drive wheels cannot receive sufficient traveling power to escape from the mud or depression.

Preferably, the clutch and the differential locker are configured so that the clutch is engaged when the differential locker is set in the locking state.

Therefore, due to the engagement of the clutch in cooperation with the setting of the differential locker in the locking state, the engaged clutch transmits the power of the transmission to both the differential unit with the pair of first or second drive wheels and the remaining first or second wheel, and the differential locker set in the locking state evenly transmits the output power of the differential unit to the pair of first or second drive wheels, so that all of the first and second drive wheels of the vehicle are surely driven by the power of the transmission, thereby further improving the off-road traveling performance of the vehicle.

Preferably, the clutch, the differential locker and the brake are configured so that the clutch is engaged and the differential locker is set in the locking state when the slidable pawl of the brake is disposed at the braking position.

Therefore, while the brake of the PTO unit is set to brake the upstream shaft part of the PTO shaft, the engaged clutch transmits the braking effect of the brake to the downstream shaft as well as the upstream shaft part, thereby applying the braking effect to the differential unit with the pair of first or second wheels and to the remaining first or second wheel. Simultaneously, the differential locker set in the locking state evenly applies the braking effect of the braked differential unit to both the pair of first or second wheels rotatably integrated with each other. As a result, the braking effect of the brake of the PTO unit is surely applied to all the first and second drive wheels of the vehicle, thereby surely and swiftly braking or parking the vehicle.

Preferably, the PTO unit is operatively connected to a mode selection manipulator for selecting one of a two-wheel drive (hereinafter, referred to as "2WD") mode, a normal four-wheel drive (hereinafter, referred to as "4WD") mode, a differential-locked 4WD mode and a parking mode. When the mode selection manipulator is manipulated to select the 2WD mode, the slidable pawl of the brake is disposed at the unbraking position, the differential locker is set in the unlocking state and the clutch is disengaged. When the mode selection manipulator is manipulated to select the normal 4WD mode, the slidable pawl of the brake is disposed at the unbraking position, the differential locker is set in the unlocking state and the clutch is engaged. When the mode selection manipulator is manipulated to select the differential-locked 4WD mode, the slidable pawl of the brake is disposed at the unbraking position, the differential locker is set in the locking state and the clutch is engaged. When the mode selection manipulator is manipulated to select the parking mode, the slidable pawl of the brake is disposed at the braking position, the differential locker is set in the locking state and the clutch is engaged.

Therefore, due to the simple operation of the mode selection manipulator, the level of traveling performance of the vehicle and the braking or unbraking state of the brake of the PTO unit serving as a parking brake of the vehicle can be easily selected. More specifically, unless the mode selection manipulator is manipulated to select the parking mode, i.e., while the first and second drive wheels are free from the parking brake, one of the three (first, second and third) modes can be selected to select the level of traveling performance. The first mode is the 2WD mode to ensure a high-speed or normal on-road traveling performance of the vehicle with economic energy consumption for driving only the first drive wheel (or wheels) in comparison with the other 4WD modes. Further, the pair of first or second drive wheels are differentially rotatable to ensure smooth turn of the vehicle. The second mode is the normal 4WD mode to ensure a stable on-road or normal off-road traveling performance of the vehicle by driving all the first and second drive wheels in comparison with the 2WD mode. The third mode is the differential-locked 4WD mode to ensure a tough off-road traveling performance of the vehicle by driving all the first and second drive wheels and by differential-locking the pair of first or second drive wheels to each other in comparison with the normal 4WD mode. Further, once the mode selection manipulator is operated to select the parking mode, the engaged clutch ensures the parking braking effect of the brake to be applied to the differential unit with the pair of first or second wheels and to the remaining first or second drive wheel, and the differential locker set in the locking state ensures the braking effect to be applied to both the pair of first or second drive wheels rotatably integrated with each other, thereby surely and swiftly braking or parking the vehicle.

These, further and other objects, features and advantages will appear more fully from the following detailed description of the invention with reference to the attached drawings.

BRIEF DESCRIPTION OF THE DRAWINGS

FIGS. 11A to 11D are fragmentary sectional views of PTO unit 102D linked with a differential locker 167 via a linkage 114, FIG. 11A showing a 2WD mode, FIG. 11B showing a normal 4WD mode, FIG. 11C showing a differential-locked 4WD mode, and FIG. 11D showing a parking mode.

DETAILED DESCRIPTION OF THE INVENTION

Figure 1:
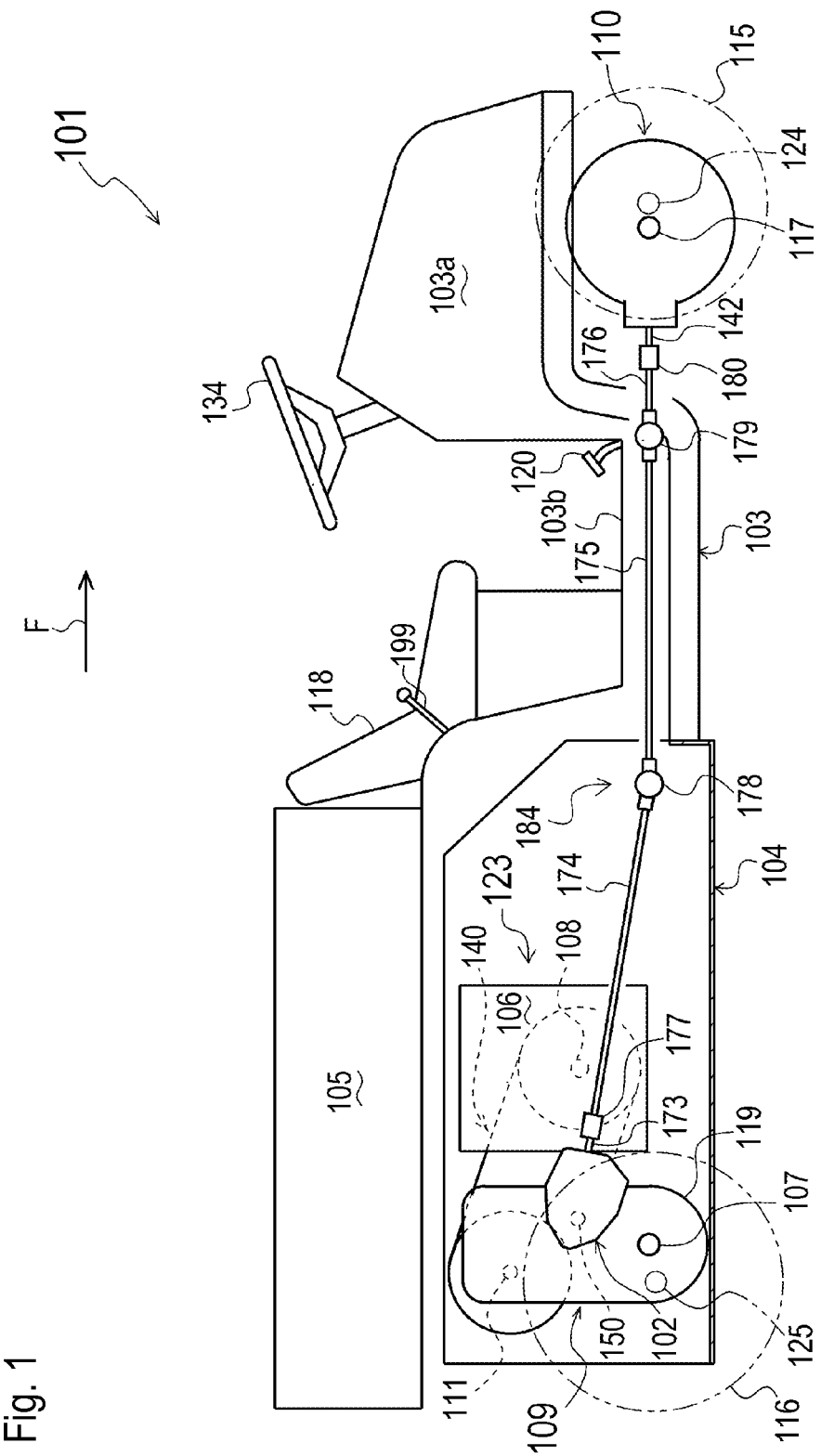
FIG. 1 is a side view of an entire four-wheel drive vehicle 101 provided with a PTO unit 102 according to the invention.

Embodiments of the invention will be described. In the following descriptions of embodiments, positions and directions of all devices, units, components and portions are defined on an assumption that a four-wheel drive utility vehicle (hereinafter simply referred to as "vehicle") 101 faces forward in a direction designated by an arrow F shown in FIG. 1 and other drawings. Further, especially, regarding later-discussed rear transaxle 109, front transaxle 110 and PTO unit 102, if two sides are compared, one side closer to the lateral center of each of these devices is referred to as a "proximal" side, and the other side farther from the lateral center of the corresponding device is referred to as "distal". However, the described positions and directions are merely representative. They can be changed in correspondence to a change of design.

A general structure of vehicle 101 equipped with a PTO unit 102 according to the invention will be described with reference to FIGS. 1 and 2, vehicle 101 includes a front frame 103 and a rear frame 104 joined to each other to constitute a chassis of vehicle 101. Rear frame 104 includes a horizontal floorboard and vertical front, rear, right and left sideboards. The floorboard is substantially rectangular in the plan view, and the sideboards are disposed upright from front, rear, right and left ends of the floorboard. A cargo deck 105 is mounted on rear frame 104 so as to be vertically rotatable for loading and unloading.

An engine 106 serving as a prime mover of vehicle 101 is disposed in rear frame 104 so as to orient its crankshaft laterally of vehicle 101. Engine 106 has an engine output shaft 108 that projects rightward or leftward (in this embodiment, leftward). A rear transaxle 109 is disposed rearward of engine 106. Rear transaxle 109 includes a transaxle casing 119 incorporating a reverser gear transmission 201 and a differential unit 122. Right and left rear wheels 116 are drivingly connected to differential unit 122 so as to serve as first drive wheels of vehicle 101 driven by rear transaxle 109 and are supported by rear frame 104 via respective suspensions (not shown).

An input shaft 111 of rear transaxle 109 projects rightward or leftward (in this embodiment, leftward) from transaxle casing 119 in the same lateral direction of engine output shaft 108, and is drivingly connected to engine output shaft 108 via a continuously variable belt transmission (hereinafter referred to as "CVT") 140. In other words, engine output shaft 108 also serves as an input shaft (a drive pulley shaft) of CVT 140, and input shaft 111 of rear transaxle 109 also serves as an output shaft (a driven pulley shaft) of CVT 140. Engine 106, CVT 140 and rear transaxle 109 are assembled together so as to constitute a power unit 123.

Front frame 103 includes a rear portion joined to rear frame 104 and a front portion that is higher than the rear portion by a step. A front transaxle 110 carrying right and left front wheels 115 is disposed under the front portion of front frame 103 and is supported by the front portion front frame 103. Right and left front wheels 115 serving as second drive wheels of vehicle 101 driven by front transaxle 110 are supported by front frame 103 via suspensions (not shown). A hood (bonnet) 103a is mounted upward on the front portion of front frame 103. A rear portion of hood 103a is formed as a dashboard. A steering wheel 134 is extended upwardly rearward from the dashboard. A brake pedal 120 is disposed at a bottom portion of the dashboard.

A horizontal platform 103b is spread over the rear portion of front frame 103 between the dashboard of hood 103a and a front end of rear frame 104. A driver's seat 118 (that may be provided with an assistant's seat) is mounted on the rear portion of front frame 103 immediately forward of rear frame 104, and platform 103b is spread forward, rightward and leftward from a bottom portion of driver's seat 118. A parking lever 199 is disposed on a right or left side (in this embodiment, right side) of driver's seat 118.

As detailed later, a PTO unit 102 is mounted on transaxle casing 119 of rear transaxle 109 laterally opposite CVT 140, and a front-wheel driving transmission 184 including a propeller shaft 175 disposed under platform 103b is interposed between PTO unit 102 and front transaxle 110 so as to transmit power taken-off from reverser gear transmission 201 via PTO unit 102 to front transaxle 110.

Figure 2:
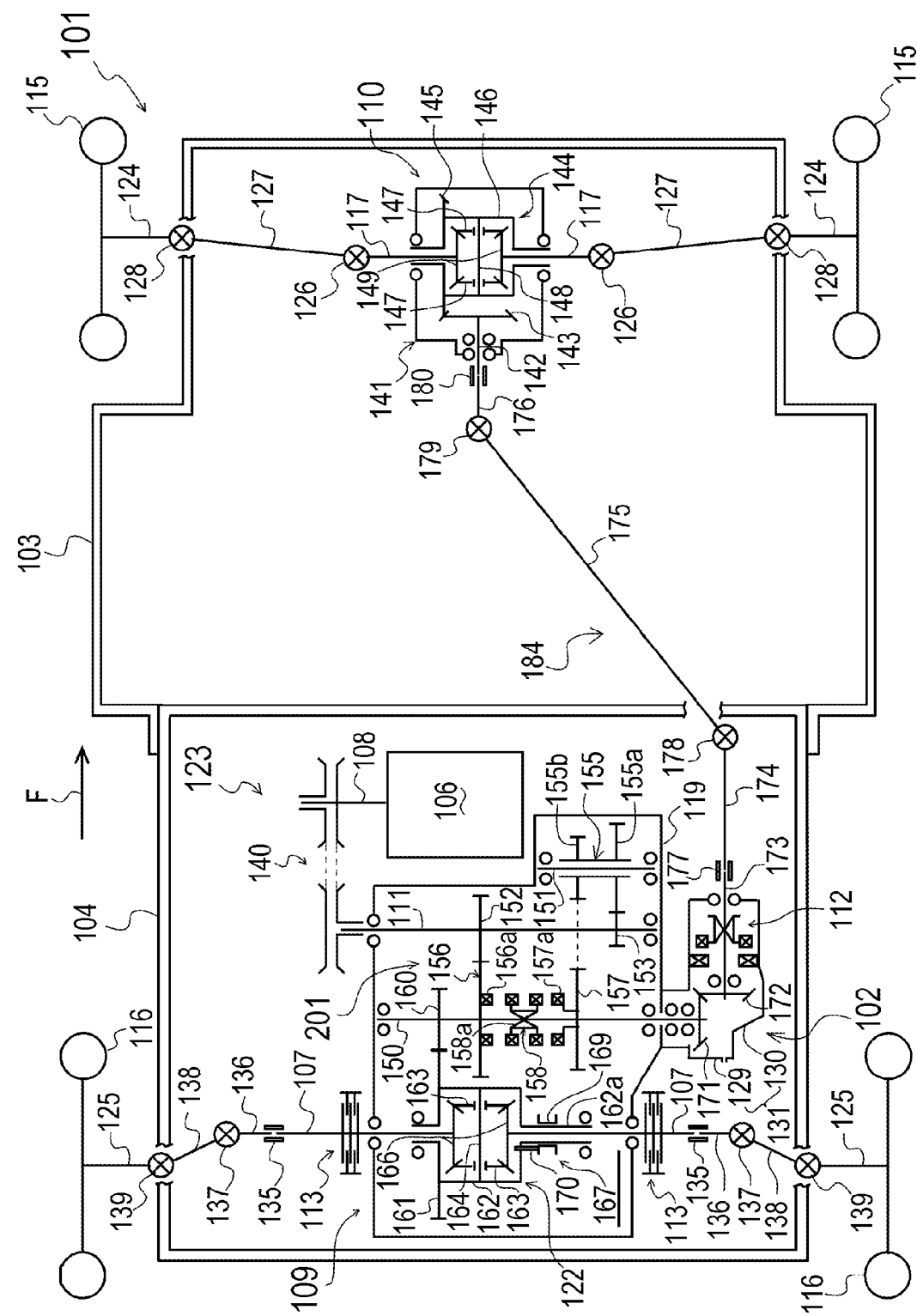
FIG. 2 is a skeleton diagram of a power train of vehicle 101.
Figure 3:
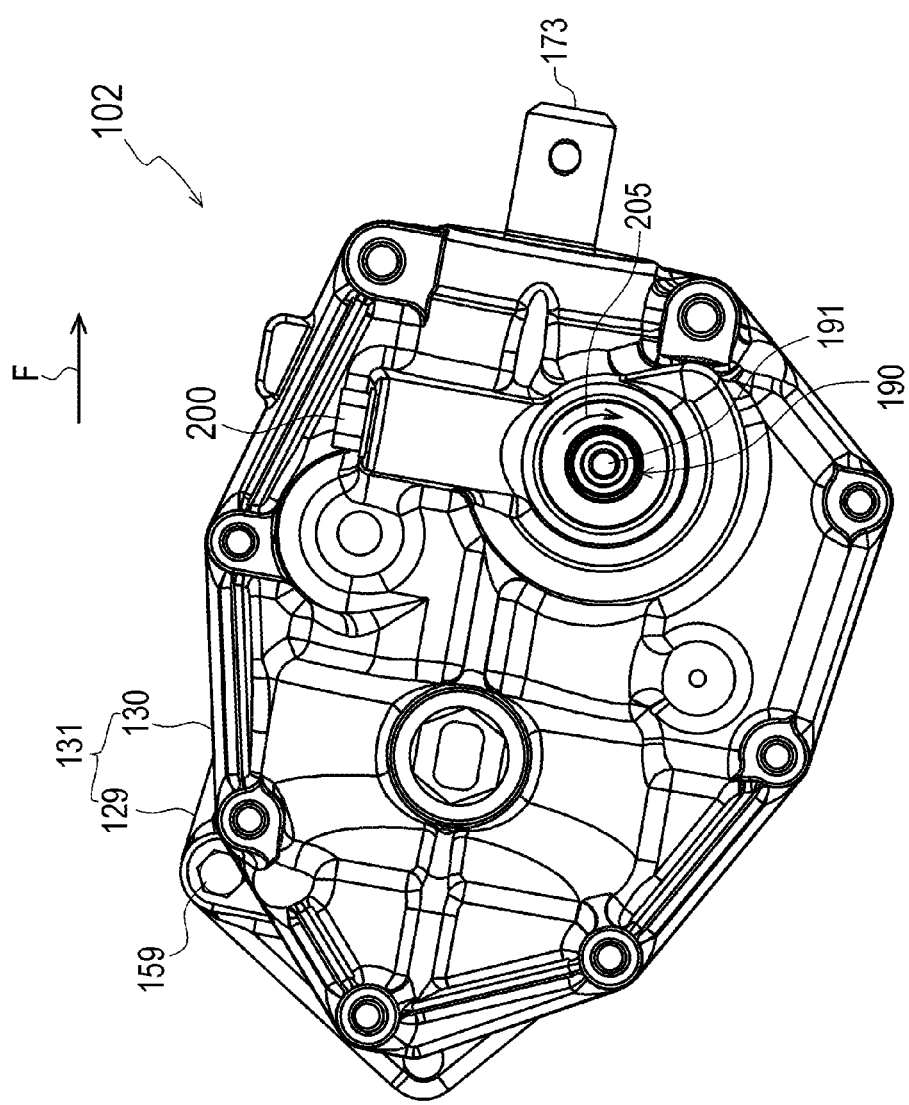
FIG. 3 is a side view of PTO unit 102.

Referring to FIGS. 1, 2 and 3, a power train of vehicle 101 will be described. FIG. 1 illustrates a typical arrangement of transaxle casing 119 of rear transaxle 109 incorporating reverser gear transmission 201 in an upper portion thereof and incorporating differential unit 122 in a lower portion thereof. Reverser gear transmission 201 includes input shaft 111, a reverser transmission shaft 150 and a reduction shaft 151. These shafts 111, 150 and 151 are supported in transaxle casing 119 so as to extend in the lateral direction of vehicle 101 and parallel to one another.

Reverser gear transmission 201 includes a forward traveling reduction gear train and a backward traveling reduction gear train. A forward traveling drive gear 152 is fixed on input shaft 111. A forward traveling driven gear 156 that is diametrically larger than forward traveling drive gear 152 is fitted on reverser transmission shaft 150 rotatably relative to reverser transmission shaft 150. Forward traveling drive and driven gears 152 and 156 mesh with each other so as to constitute the forward traveling reduction gear train of reverser gear transmission 201.

A double gear 155 is fitted on reduction shaft 151. Double gear 155 includes a large diameter gear 155a and a small diameter gear 155b rotatably integrated with each other. A backward traveling drive gear 153 is fixed on input shaft 111 and meshes with large diameter gear 155a of double gear 155. A backward traveling driven gear 157 is fitted on reverser transmission shaft 150 rotatably relative to reverser transmission shaft 150 and meshes with small diameter gear 155*b* of double gear 155. Gears 153, 155*a*, 155*b* and 157 constitute the backward traveling reduction gear train of reverser gear transmission 201 having a large speed-reduction rate between gears 153 and 157, which is larger than that of the forward traveling reduction gear train between gears 152 and 156. Therefore, even if the rotary speed of engine output shaft 108 is constant, vehicle 101 has the backward traveling speed reduced in comparison with the forward traveling speed.

Alternatively, the rotation direction of engine output shaft 108 may be changed, for example, so that gears 152 and 156 constitute a backward traveling reduction gear train and gears 153, 155*a*, 155*b* and 157 constitute a forward traveling reduction gear train having the speed-reduction rate which is larger than that of the backward traveling reduction gear train.

A spline hub 158*a* is fixed on reverser transmission shaft 150. A shifter 158 is spline-fitted on spline hub 158*a* so as to be unrotatable relative to spline hub 158*a* and reverser transmission shaft 150 and so as to be slidable on spline hub 158*a* in the axial direction of reverser transmission shaft 150. Forward traveling driven gear 156 is formed with clutch teeth 156*a*, and shifter 158 is formed with clutch teeth corresponding to clutch teeth 156*a*. Backward traveling driven gear 157 is formed with clutch teeth 157*a*, and shifter 158 is formed with clutch teeth corresponding to clutch teeth 157*a*. Shifter 158 is shiftable between a forward traveling position, where shifter 158 meshes with forward traveling driven gear 156 with clutch teeth 156*a* to drivingly connect the forward traveling reduction gear train to reverser transmission shaft 150, and a backward traveling position, where shifter 158 meshes with backward traveling driven gear 157 with clutch teeth 157*a* to drivingly connect the backward traveling reduction gear train to reverser transmission shaft 150.

Reverser transmission shaft 150 serves as an output shaft of reverser gear transmission 201 so that whether reverser transmission shaft 150 rotates in a direction for forward traveling or in another direction for backward traveling depends on whether shifter 158 is set at the forward traveling position or the backward traveling position. Shifter 158 is operatively connected to a reverser manipulator (not shown), e.g., a lever or a switch, which is shiftable between a forward traveling position corresponding to the forward traveling position of shifter 158 and a backward traveling position corresponding to the backward traveling position of shifter 158. Shifter 158 may be further shiftable to a neutral position where shifter 158 meshes with neither gear 156 nor gear 157, and the reverser manipulator may be further shiftable to a neutral position corresponding to the neutral position of shifter 158.

Right and left differential yoke shafts 107 are journalled by transaxle casing 119 and are differentially rotatably connected to each other via differential unit 122 in transaxle casing 119. Right and left differential yoke shafts 107 extend rightwardly and leftwardly outward from transaxle casing 119 so as to be provided thereon with respective disc brakes that serve as foot brakes 113 operatively connected to brake pedal 120 so that both foot brakes 113 are actuated to brake respective differential yoke shafts 107, i.e., right and left rear wheels 116, when brake pedal 120 is depressed.

Right and left differential yoke shafts 107 are fixed at respective distal ends thereof to respective coaxial shafts 136 via respective coupling sleeves 135. On the other hand, right and left rear wheels 116 have respective axles 125 supported by rear frame 104. Right and left propeller shafts 138 are drivingly connected at respective proximal ends thereof to respective shafts 136 via respective universal joints 137, and are drivingly connected at respective distal ends thereof to respective axles 125 via respective universal joints 139, thereby drivingly connecting right and left differential yoke shafts 107 to respective right and left rear wheels 116.

Differential unit 122 includes a bull gear 161, a differential casing 162, differential pinions 163, a differential pinion pivot 164 and differential side gears 166. Bull gear 161 meshes with a reverser output gear 160 fixed on reverser transmission shaft 150 so as to serve as an input gear of differential unit 122 for receiving the output power from reverser gear transmission 201. Bull gear 161 is fixed on differential casing 162 journaling right and left differential yoke shafts 107. Differential pinion pivot 164 is disposed in differential casing 162 so as to be rotatably integral with differential casing 162. In differential casing 162, symmetric differential pinions 163 are (or single differential pinion 163 may be) pivoted on differential pinion pivot 164, and right and left differential side gears 166 are fixed on proximal ends of respective right and left differential yoke shafts 107, so that each differential pinion 163 is disposed between right and left differential side gears 166 so as to mesh with both right and left differential side gears 166.

Differential unit 122 is provided with a differential locker 167. Differential locker 167 includes a differential locking slider 169 axially slidably fitted on a boss portion 162*a* of differential casing 162 supporting corresponding (in this embodiment, right) differential yoke shaft 107. At least one lock pin 170 is extended from differential locking slider 169 toward corresponding (in this embodiment, right) differential side gear 166. Differential locking slider 169 is shiftable between a locking position and an unlocking position. When differential locking slider 169 is disposed at the locking position, lock pin 170 engages with corresponding differential side gear 166 so as to lock right and left differential yoke shafts 107 to each other, thereby rotatably integrating right and left rear wheels 116 with each other. This state of differential locker 167 is referred to as a locking state of differential locker 167. When differential locking slider 169 is disposed at the unlocking position, lock pin 170 disengages from corresponding differential side gear 166 so as to unlock right and left differential yoke shafts 107 from each other, thereby allowing differential rotation of right and left rear wheels 116. This state of differential locker 167 is referred to as an unlocking state of differential locker 167. Differential locking slider 169 is operatively connected to a differential locking manipulator (not shown) such as a lever or a pedal.

Front transaxle 110 includes a transaxle casing 141. Transaxle casing 141 incorporates a differential unit 144 and journals right and left differential yoke shafts 117 differentially rotatably connected to each other via differential unit 144 in transaxle casing 141. On the other hand, right and left front wheels 115 have respective axles 124 supported by front frame 103. Right and left propeller shafts 127 are drivingly connected at respective proximal ends thereof to respective differential yoke shafts 117 via respective universal joints 126, and are drivingly connected at respective distal ends thereof to respective axles 124 via respective universal joints 128, thereby drivingly connecting right and left differential yoke shafts 117 to respective right and left front wheels 115.

An input shaft 142 of front transaxle 110 is journalled by transaxle casing 141 and projects rearward from transaxle casing 141 to receive power taken-off from reverser gear transmission 201 in transaxle casing 119 of rear transaxle 109. A bevel gear 143 is fixed on a front end of input shaft 142 in transaxle casing 141.

Differential unit 144 includes a bevel bull gear 145, a differential casing 146, differential pinions 147, a differential pinion pivot 148 and differential side gears 149. Bevel bull gear 145 meshes with bevel gear 143. Bevel bull gear 145 is fixed on differential casing 146 journaling right and left differential yoke shafts 117. Differential pinion pivot 148 is disposed in differential casing 146 so as to be rotatably integral with differential casing 146. In differential casing 146, symmetric differential pinions 147 are (or single differential pinion 147 may be) pivoted on differential pinion pivot 148, and right and left differential side gears 149 are fixed on proximal ends of respective right and left differential yoke shafts 117, so that each differential pinion 147 is disposed between right and left differential side gears 149 so as to mesh with both right and left differential side gears 149.

In this embodiment, differential unit 144 of front transaxle 110 is not provided with a differential locker. Alternatively, differential unit 144 of front transaxle 110 may be provided with a differential locker. In this regard, an alternative PTO unit 102D is described later as being operatively connected to differential locker 167 of differential unit 122 of rear transaxle 109. Alternatively, the differential locker of differential unit 144 of front transaxle 110 or both the differential lockers of differential units 122 and 144 of rear and front transaxles 109 and 110 may be operatively connected to PTO unit 102D.

PTO unit 102 is mounted on a right or left (in this embodiment, right) side surface of transaxle casing 119 of rear transaxle 109 laterally opposite CVT 140. PTO unit 102 includes a PTO casing 131 and a PTO shaft 173. PTO shaft 173 projects forward from PTO casing 131 and is fixed at a front end thereof to a coaxial shaft 174 via a coupling sleeve 177. On the other hand, input shaft 142 of front transaxle 110 projecting rearward from transaxle casing 141 is fixed at a rear end thereof to a coaxial shaft 176 via a coupling sleeve 180. Propeller shaft 175 extended under platform 103b is drivingly connected at a rear end thereof to shaft 174 via a universal joint 178 and is drivingly connected at a front end thereof to shaft 176 via a universal joint 179. In this way, shafts 174, 175 and 176, coupling sleeves 177 and 180 and universal joints 178 and 179 constitute front-wheel driving transmission 184 drivingly connecting PTO shaft 173 to input shaft 142 of front transaxle 110.

Referring to FIGS. 2 to 6, PTO unit 102 will be described in detail. PTO casing 131 of PTO unit 102 is dividable into a right or left (in this embodiment, left) proximal side housing 129 and a right or left (in this embodiment, right) distal side housing 130. Right and left housings 129 and 130 are joined to each other via a vertical joint plane so as to constitute PTO casing 131.

Figure 5:
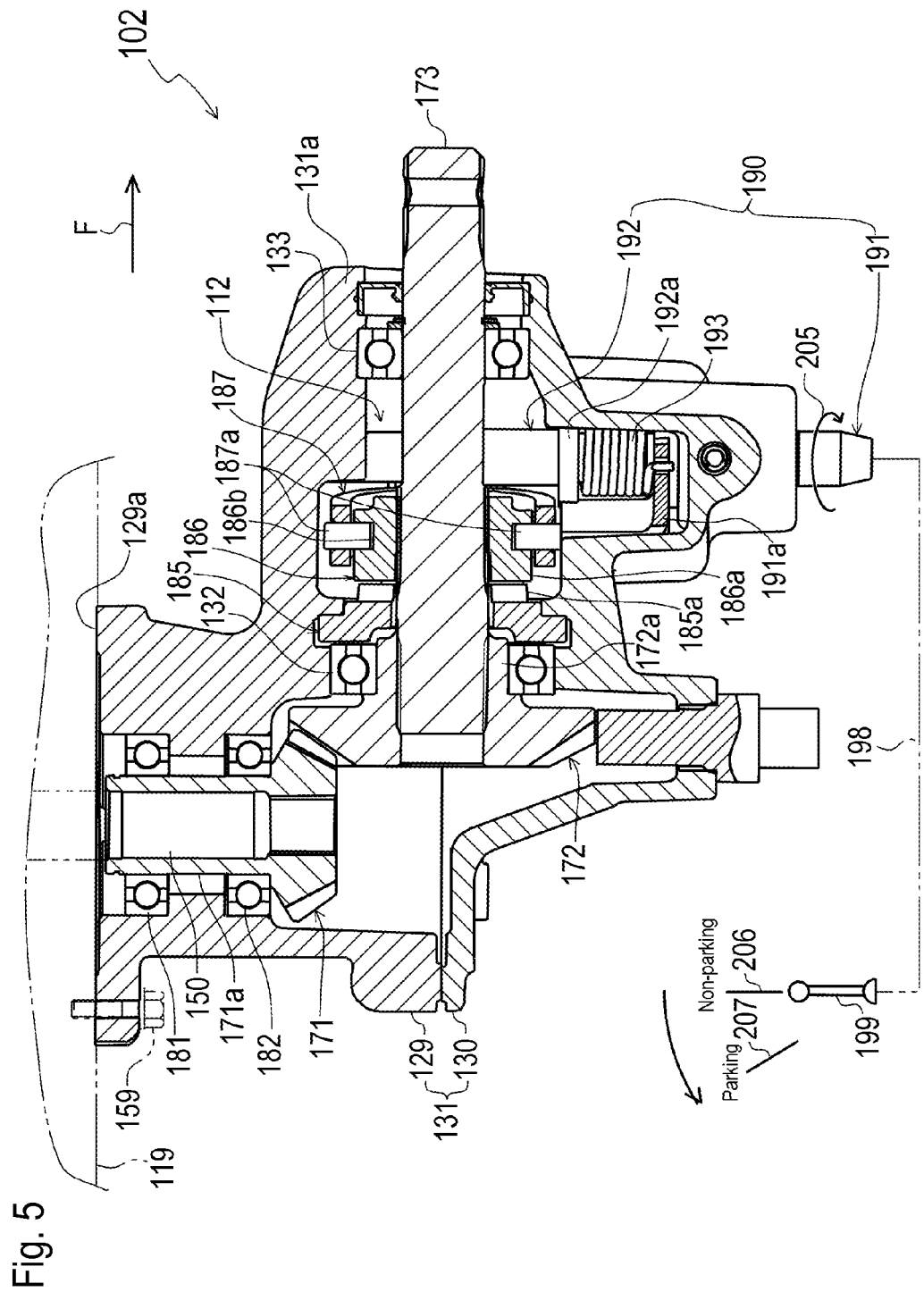
FIG. 5 is a sectional plan view of PTO unit 102.
Figure 6:
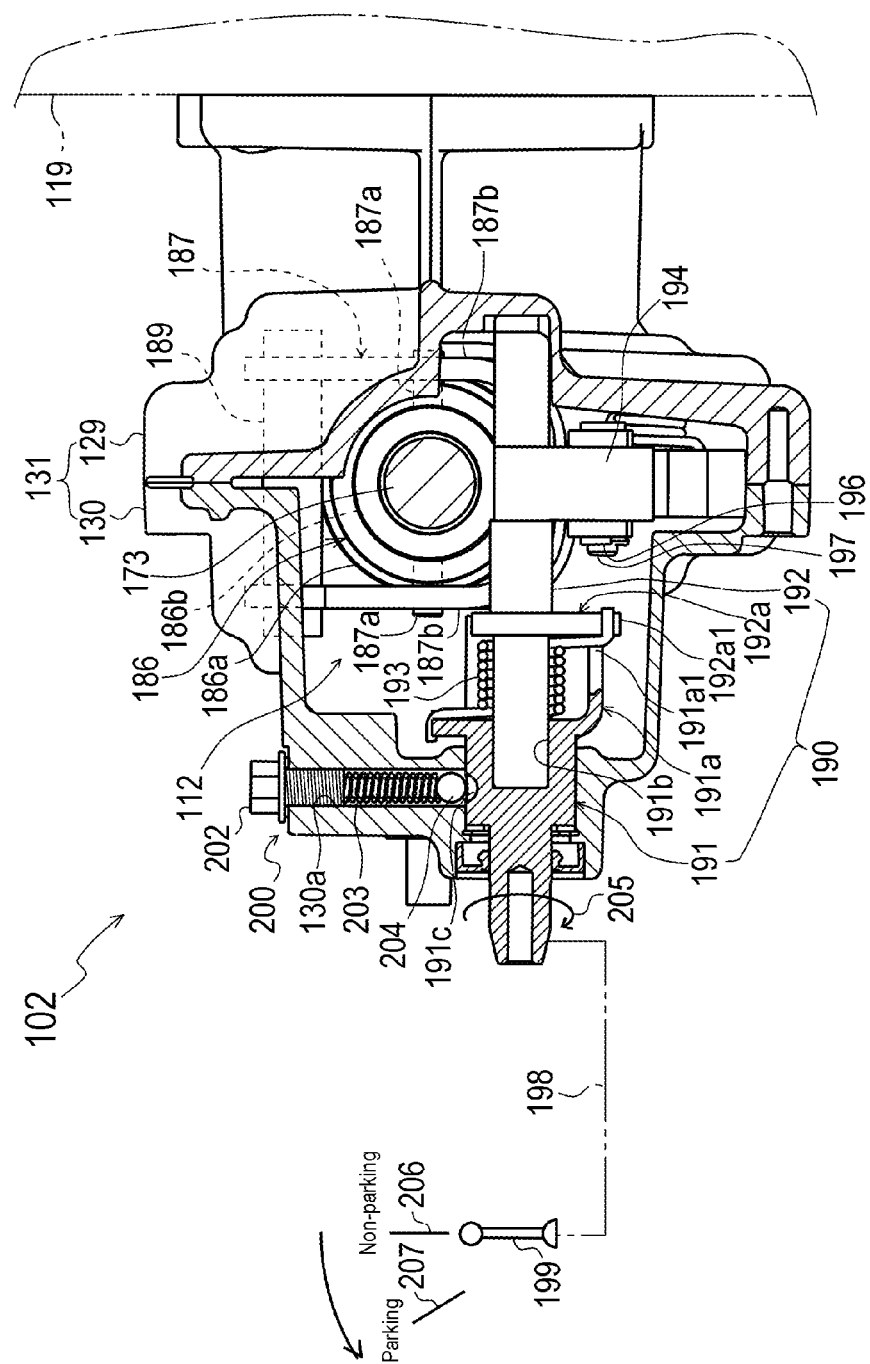
FIG. 6 is a sectional front view of PTO unit 102.

As understood from FIGS. 5 and 6, PTO casing 131 is L-shaped in plan view so as to have a lateral extending portion and a forward extending portion. In this regard, proximal side housing 129 is bent in an L-shape in plan view so as to have a lateral extending portion corresponding to the lateral extending portion of PTO casing 131, and so as to have a forward extending portion to be joined to distal side housing 130 to form the forward extending portion of PTO casing 131. The lateral extending portion of proximal side housing 129 has a vertical proximal (in this embodiment, left) end surface 129a joined to an outer (right) side surface of transaxle casing 119 of rear transaxle 109. In this regard, the lateral extending portion of proximal side housing 129 is formed with a flange having proximal end surface 129a so that the flange is fastened to transaxle casing 119 via bolts 159.

A bevel gear 171 is formed with an axial boss 171a that is journalled by the lateral extending portion of proximal side housing 129 via right and left bearings 181 and 182 so as to extend laterally and coaxially to reverser transmission shaft 150. A right or left (in this embodiment, right) distal end portion of reverser transmission shaft 150 projects outward from the outer side surface of transaxle casing 119 laterally opposite the right or left (in this embodiment, left) distal end portion of input shaft 111 projecting outward from transaxle casing 119 into CVT 140. The projecting distal end portion of reverser transmission shaft 150 is fixedly inserted into axial boss 171a of bevel gear 171 in the lateral extending portion of proximal side housing 129.

Bevel gear 171 meshes with a bevel gear 172 formed with an axial boss 172a. PTO shaft 173 is extended coaxially to axial boss 172a of bevel gear 172 and is fixedly inserted at a rear end portion thereof into axial boss 172a. In this regard, the forward extending portion of L-shaped proximal side housing 129 and distal side housing 130 joined to the distal (in this embodiment, right) end of proximal side housing 129 define a PTO shaft housing portion 131a corresponding to the forward extending portion of PTO casing 131 to journal axial boss 172a of bevel gear 172 and PTO shaft 173. Proximal and distal side housings 129 and 130 sandwich a rear bearing 132 journaling axial boss 172a of bevel gear 172 and sandwich a front bearing 133 journaling PTO shaft 173 extended forward from axial boss 172a. Therefore, axial boss 172a of bevel gear 172 and PTO shaft 173 are extended to have an axis disposed on the vertical joint plane between proximal and distal side housings 129 and 130.

In the plan view as shown in FIG. 5, the axis of axial boss 172a and PTO shaft 173 is extended fore-and-aft of vehicle 101 so that PTO shaft 173 projects forward from a front end of PTO shaft housing portion 131a of PTO casing 131 so as to be drivingly connected to propeller shaft 175 disposed forward from power unit 123 including rear transaxle 109 with PTO unit 102.

Figure 4:
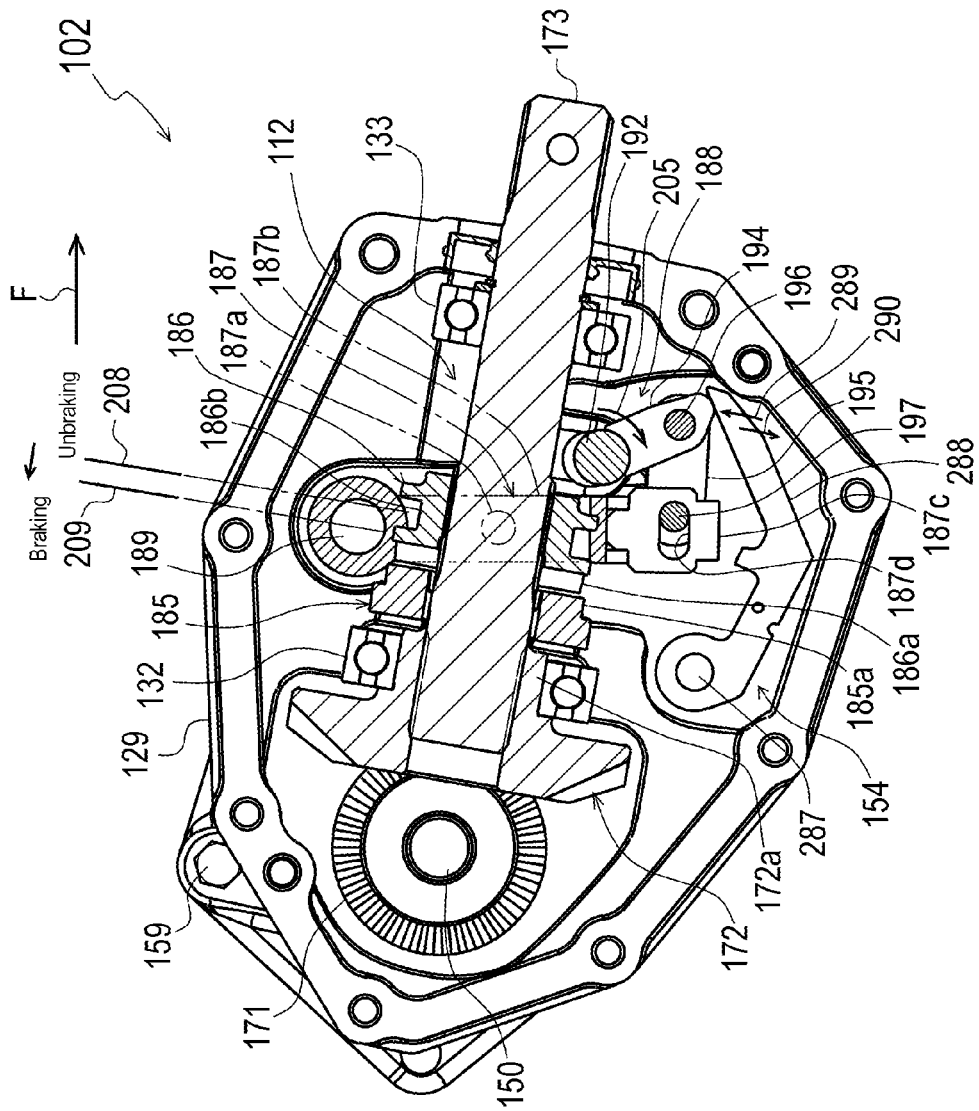
FIG. 4 is a side view of PTO unit 102 after a distal (right) housing is removed from a PTO casing of PTO unit 102.

On the other hand, in the side view as shown in FIGS. 3 and 4, PTO shaft 173 is inclined forwardly downward suitably for its driving connection to propeller shaft 175 disposed at the low position of vehicle 101 under platform 103b. PTO casing 131 is designed to have PTO shaft housing portion 131a slanted in the side view coincidently to the desired slant angle of PTO shaft 173. In this regard, PTO casing 131 (or proximal side housing 129 of PTO casing 131) may be designed to enable optional selection of the mounting angle of PTO casing 131 on transaxle casing 119 (or the joint position of proximal side housing 129 to transaxle casing 119).

A parking brake 112 is disposed in PTO shaft housing portion 131a of PTO casing 131. Parking brake 112 includes a fixture 185 and a shifter 186. Fixture 185 is fixed to an inner wall of PTO casing 131. Fixture 185 is ring-shaped to have a center hole so that PTO shaft 173 passed through the center hole of fixture 185 is rotatably free from fixture 185. Shifter 186 is spline-fitted on PTO shaft 173 so as to be rotatably integral with PTO shaft 173 and so as to be axially slidable along PTO shaft 173.

Fixture 185 is formed on an axial (front) end thereof with pawls 185a, and shifter 186 is formed on an axial (rear) end thereof with pawls 186a facing pawls 185a. Pawls 185a of fixture 185 are defined as unslidable pawls 185a fixed to PTO casing 131 so as to be unslidable along PTO shaft 173, and pawls 186a of shifter 186 are defined as slidable pawls 186a axially slidably fitted on PTO shaft 173. Pawls 185a and 186a are tapered to facilitate the engagement and disengagement of slidable pawls 186a with and from unslidable pawls 185a.

Due to the slide of shifter 186 on PTO shaft 173, pawls 186a of shifter 186 selectively engage or disengage with and from pawls 185a of fixture 185. Referring to FIG. 4, when shifter 186 is set at an unbraking position 208 where slidable pawls 186a disengage from unslidable pawls 185a, shifter 186 and PTO shaft 173 are rotatably free from fixture 185, thereby being allowed to follow the rotation of reverser transmission shaft 150 driving rear wheels 116 via differential unit 122 and to transmit its rotation following reverser transmission shaft 150 to front transaxle 110 driving front wheels 115 via front-wheel driving transmission 184. When shifter 186 is set at a braking position 209 where slidable pawls 186a engage with unslidable pawls 185a, shifter 186 rotatably integrated with PTO shaft 173 is locked to fixture 185 fixed to PTO casing 131 so as to brake PTO shaft 173, thereby braking front wheels 115 drivingly connected to PTO shaft 173 via front-wheel driving transmission 184 and front transaxle 110, and thereby applying its braking force to rear wheels 116 via reverser transmission shaft 150 and differential unit 122.

Incidentally, for the convenience of supporting claims, unbraking position 208 of shifter 186 is synonymous with unbraking position 208 of slidable pawls 186a of parking brake 112, and braking position 209 of shifter 186 is synonymous with braking position 209 of slidable pawls 186a of parking brake 112. The same things are said about parking brakes 210 and 241 of later-discussed alternative PTO units 102A, 102B and 102C and about a parking brake 263b of clutch-brake unit 263 of a later-discussed alternative PTO unit 102D.

As best understood from FIG. 6, a U-shaped fork 187 is disposed to have right and left vertical portions 187b disposed on right and left sides of shifter 186, and to have an arcuate bottom portion disposed along a lower half portion of shifter 186. Shifter 186 is formed with an annular groove 186b. Right and left connection pins 187a project from respective right and left vertical portions 187b of fork 187 into right and left portions of annular groove 186b so as to connect fork 187 to shifter 186. Upper end portions of right and left vertical portions 187b of fork 187 are supported on a lateral horizontal fork pivot shaft 189 disposed above shifter 186 so that fork 187 is rotatably centered on fork pivot shaft 189. As best understood from FIG. 4, due to the rotation of fork 187 centered on fork pivot shaft 189, right and left vertical portions 187b of fork 187 connected to shifter 186 via connection pins 187a tilt to change its angle from the center axis of fork pivot shaft 189 in the side view so as to shift shifter 186 between unbraking position 208 and braking position 209.

As shown in FIG. 4, a fork operation mechanism 188 for operating fork 187 is provided in PTO shaft housing portion 131a of PTO casing 131. Referring to FIGS. 3 to 6, fork operation mechanism 188 includes a parking operation shaft 190, a first link 194 and a second link 195. Parking operation shaft 190 is disposed below PTO shaft 173 adjacent to shifter 186 and fork 187 opposite fixture 185 in the axial direction of PTO shaft 173. In this embodiment, fixture 185 is disposed rearward from shifter 186 and fork 187, and parking operation shaft 190 is disposed forward from shifter 186 and fork 187. Parking operation shaft 190 is extended laterally horizontally so as to have a right or left (in this embodiment, left) proximal end portion supported by proximal side housing 129, and so as to have a right or left (in this embodiment, right) distal end portion supported by distal side housing 130. First link 194 and second link 195 link fork 187 to parking operation shaft 190 so as to tilt fork 187 according rotation of parking operation shaft 190 centered on the lateral axis of parking operation shaft 190.

Parking operation shaft 190 includes an outer end shaft 191 and a main shaft 192 connected coaxially to each other. Outer end shaft 191 is pivotally supported by distal side housing 130 so as to be defined as the distal end portion of parking operation shaft 190 supported by distal side housing 130. A distal (in this embodiment, right) end portion of outer end shaft 191 projects outward from PTO casing 131, i.e., distal side housing 130, so as to be operatively connected via a link 198 to parking lever 199 serving as a manipulator for operating parking brake 112 of PTO unit 102 as shown in FIGS. 5 and 6. A proximal (in this embodiment, left) end portion of outer end shaft 191 disposed in PTO casing 131 is formed with an axial recess 191b, and a distal (in this embodiment, right) end portion of main shaft 192 is fitted into recess 191b so as to be rotatable relative to outer end shaft 191. A proximal (in this embodiment, left) end portion of main shaft 192 is pivotally supported by proximal side housing 129 so as to be defined as the proximal end portion of parking operation shaft 190 supported by proximal side housing 129.

Referring to FIGS. 4 and 6, first link 194 is fixed at an upper end portion thereof on main shaft 192, is extended downward from main shaft 192, and is articulately joined at a lower end portion thereof to a front end of second link 195 via a joint pin 196. A joint 187c having a fore-and-aft long slot 187d is fixed to the bottom portion of U-shaped fork 187 so as to extend downward from fork 187. A joint pin 197 projects from a rear end portion of second link 195 into slot 187d so as to articulately join second link 195 to joint 187c of fork 187.

Referring to FIGS. 4 to 6, in the right side view of PTO unit 102 as shown in FIG. 4, a clockwise rotation direction 205 of main shaft 192 corresponds to rotation of parking lever 199 from a non-parking position 206 to a parking position 207 as shown in FIGS. 5 and 6. This rotation of main shaft 192 in direction 205 pushes second link 195 rearward. As best understood from FIG. 4, when main shaft 192 is disposed at a rotational position corresponding to non-parking position 206 of parking lever 199, joint pin 197 is disposed at a front end of slot 187d and shifter 186 is disposed at unbraking position 208. At an early stage of the rotation of main shaft 192 in direction 205 in response to rotation of parking lever 199 from non-parking position 206 to parking position 207, the rearward movement of second link 195 according to the rotation of main shaft 192 in direction 205 merely moves joint pin 197 in slot 187d so as to hold shifter 186 and fork 187 at unbraking position 208. In this way, joint pin 197 is allowed to move in slot 187d while keeping fork 187 against the rearward movement of second link 195, thereby preventing slidable pawls 186a from suddenly abutting against unslidable pawls 185a. After joint pin 197 reaches the rear end of slot 187d, second link 195 moved rearward by rotating main shaft 192 in direction 205 pushes joint 187c at the bottom of fork 187 via joint pin 197 so as to move shifter 186 to braking position 209 where pawls 185a and 186a engage with each other.

When main shaft 192 rotates counterclockwise in the right side view opposite to direction 205 from its position corresponding to braking position 209 of shifter 186 according to rotation of parking lever 199 from parking position 207 to non-parking position 206, second link 195 moves forward to move joint pin 197 from the rear end of slot 187d to the front end of slot 187d so as to keep shifter 186 at braking position 209, thereby preventing slidable pawls 186a from suddenly disengaging from unslidable pawls 185a. After joint pin 197 reaches the front end of slot 187d, second link 195 moved forward by rotating main shaft 192 in the direction opposite to direction 205 pulls joint 187c via joint pin 197 so as to move shifter 186 to unbraking position 208 where pawls 185a and 186a disengage from each other.

The proximal end of outer end shaft 191 is radially expanded to be formed as a flange serving as a spring retainer 191a having a notch. The flange of outer end shaft 191 serving as spring retainer 191a is formed with a stopper arm 191a1 extend along main shaft 192. A flange is also formed on main shaft 192 so as to serve as a spring retainer 192a having a notch. The flange of main shaft 192 serving as spring retainer 192a is partly extended radially so as to form a stopper arm 192a1 to contact stopper arm 191a1.

A spring 193 is coiled around main shaft 192. One end portion of spring 193 is fitted in the notch of spring retainer 191a, and the other end portion of spring 193 is fitted in the notch of spring retainer 192a so that spring 193 biases stopper arms 191a1 and 192a1 toward each other. Therefore, normally, stopper arms 191a1 and 192a1 contact each other by the biasing force of spring 193 so as to rotatably integrate main shaft 192 with outer end shaft 191.

Outer end shaft 191 is rotatable in direction 205 according to rotation of parking lever 199 from non-parking position 206 to parking position 207. This rotation of outer end shaft 191 is accurately synchronous to the rotation of parking lever 199. Referring to FIG. 4, unbraking position 208 of shifter 186 corresponds to non-parking position 206 of parking lever 199, and braking position 209 of shifter 186 corresponds to parking position 207 of parking lever 199. Therefore, the rotation of main shaft 192 causing the slide of shifter 186 from unbraking position 208 to braking position 209 should be synchronous to the rotation of outer end shaft 191 synchronized to the rotation of parking lever 199 from non-parking position 206 to parking position 207. However, the fact is that the rotation of main shaft 192 is likely intermittent because slidable pawls 186a of shifter 186 sliding according to the rotation of main shaft 192 cannot be inserted into respective recesses among unslidable pawls 185a to engage with pawls 185a before slidable pawls 186a coincide to the recesses among unslidable pawls 185a. When the rotation of main shaft 192 is stopped for this reason during the rotation of outer end shaft 191, a differential rotation of shafts 191 and 192 occurs so as to separate stopper arms 191a1 and 192a1 from each other, thereby causing the biasing force of spring 193 for retuning stopper arms 191a1 and 192a1 to contact each other. Once slidable pawls 186a come to coincide to the grooves among unslidable pawls 185a, slidable pawls 186a are smoothly inserted into the recesses to complete the engagement of slidable pawls 186a with unslidable pawls 185a because of the biasing force of spring 193.

On the contrary, during rotation of parking lever 199 from parking position 207 to non-parking position 206, even if slidable pawls 186a are not easily withdrawn from the recesses among unslidable pawls 185a after joint pin 197 reaches the rear end of slot 187d, the rotation of main shaft 192 interlocking with shifter 186 via links 194 and 195 opposite to direction 205 is allowed to delay after the rotation of outer end shaft 191 interlocking with parking lever 199 rotated from parking position 207 to non-parking position 206 in the same way as mentioned above, and main shaft 192 returns to follow the rotation of outer end shaft 191 by the biasing force of spring 193 as soon as slidable pawls 186a completely disengage from unslidable pawls 185a.

Further, referring to FIGS. 4, parking brake 112 is provided with a pawl locker 154. In this regard, since PTO shaft 173 is extended forwardly downward, shifter 186 axially slidably fitted on PTO shaft 173 is likable to fall forwardly downward along PTO shaft 173. Further, slidable pawls 186a are liable to escape from unslidable pawls 185a because pawls 185a and 186a are tapered. Pawl locker 154 prevents shifter 186 engaging with fixture 185 from falling along PTO shaft 173 to disengage from fixture 185 while parking lever 199 is set at parking position 207.

Pawl locker 154 includes a laterally horizontal pivot shaft 287 and a locker arm 288. Pivot shaft 287 is supported in PTO casing 131. Locker arm 288 is pivoted at a rear end portion thereof on pivot shaft 287 so as to have a vertically movable front end portion. In this regard, locker arm 288 is bent at a fore-and-aft intermediate portion thereof so that locker arm 288 is extended forwardly downward from its pivoted rear end portion to its bent intermediate portion and is extended forwardly upward from its bent intermediate portion thereof to its vertically movable front end portion. The front end portion of locker arm 288 has an upwardly forward slant upper rear edge. First link 194 extended downward from main shaft 192 of PTO operation shaft 190 is rather slant forwardly downward so as to have a lower end contacting the upper rear edge of the front end portion of locker arm 288. Further, the front end portion of locker arm 288 is biased upward by a spring (not shown) or another biasing means so as to press its upper rear edge against the lower end of first link 194.

When parking lever 199 is shifted to parking position 207 and first link 194 rotates together with main shaft 192 in direction 205, the lower end of first link 194 slides downwardly rearward on the upper rear edge of the front end portion of locker arm 288, and due to the upward biasing force, the front end portion of locker arm 299 moves upward as designated by an arrow 289 along with the downwardly rearward slide of the lower end of first link 194, thereby moving second link 195 rearward. Finally, when shifter 186 reaches braking position 209 so that slidable pawls 186a engage with unslidable pawls 185a, the upward moved front end portion of locker arm 288 biased by the spring presses the relatively downwardly rearward moved lower end of first link 194 rearward so as to prevent first link 194 from moving forward, thereby preventing shifter 186 from falling forwardly downward along PTO shaft 173 to disengage its slidable pawls 186a from unslidable pawls 185a of fixture 185. In this regard, the force of the spring biasing locker arm 288 is set to hinder the forward movement of first link 194 caused by the falling of shifter 186 due to gravity along PTO shaft 173. Therefore, when parking lever 199 is set at parking position 207, slidable pawls 186a of shifter 186 is prevented from failing to engage with unslidable pawls 185a of fixture 185, whereby parking brake 112 is surely actuated to stop or park vehicle 101.

When parking lever 199 is shifted from parking position 207 to non-parking position 206, main shaft 192 may delay after the rotation of outer end shaft 191 opposite to direction 205, however, once joint pin 197 reaches the front end of slot 187d, main shaft 192 is forcedly rotated opposite to direction 205 by spring 193 so as to follow outer end shaft 191. This forcible rotation of main shaft 192 causes first link 194 to push the upper rear edge of the front end portion of locker arm 288 downward as designated by an arrow 290 against the upward biasing force of the spring. Therefore, second link 195 is allowed to move forward so as to shift shifter 186 to unbraking position 208, whereby slidable pawls 186a of shifter 186 completely disengage from unslidable pawls 185a of fixture 185, thereby completing the unbraking operation of parking brake 112.

Further, referring to FIG. 6, a detent unit 200 is provided in distal side housing 130 of PTO casing 131 pivotally supporting outer end shaft 191 of parking operation shaft 190. Detent unit 200 includes a detent ball 204, a detent spring 203 and a bolt (or a screw) 202. Non-parking position 206 and parking position 207 of parking lever 199 are defined by respective hemisphere detent recesses 191c formed on an outer peripheral surface of outer end shaft 191 of parking operation shaft 190. A vertical detent hole 130a is formed in a wall of distal side housing 130 of PTO casing 131 so as to be open at a top end thereof upwardly outward from distal side housing 130 and so as to be open at a bottom end thereof downward to face an upper portion of outer end shaft 191 disposed in the wall of distal side housing 130. Detent ball 204 is disposed in the bottom end portion of detent hole 130a so as to be slidable and rollable on the outer peripheral surface of outer end shaft 191. Detent spring 203 is disposed in detent hole 130a above detent ball 204 so as to bias detent ball 204 downward. Bolt (or screw) 202 is screwed downward into detent hole 130a via the top opening of detent hole 130a so as to adjust the force of detent spring 203 biasing detent ball 204.

By rotating parking lever 199 to either non-parking position 206 or parking position 207, outer end shaft 191 rotates so that corresponding detent recess 191c reaches the top portion of outer end shaft 191 facing the bottom end of detent hole 130a and receives detent ball 204 biased downward by detent spring 203, thereby surely fixing outer end shaft 191 at the rotational position corresponding to selected position 206 or 207 of parking lever 199. As mentioned above, spring 193 biases stopper arm 192a1 to contact stopper arm 191a1, thereby ensuring main shaft 192 to follow outer end shaft 191 at the selected detent position. Therefore, shifter 186 is surely fixed at either unbraking position 208 or braking position 209 corresponding to selected position 206 or 207 of parking lever 199.

Alternative PTO units will be described with reference to FIGS. 2 and 7 to 11. In description of each alternative PTO unit, description of the components designated by the same reference numerals as those of PTO unit 102 shown in FIGS. 1 to 6 is omitted because they are identical or similar to those of PTO unit 102.

Figure 7:
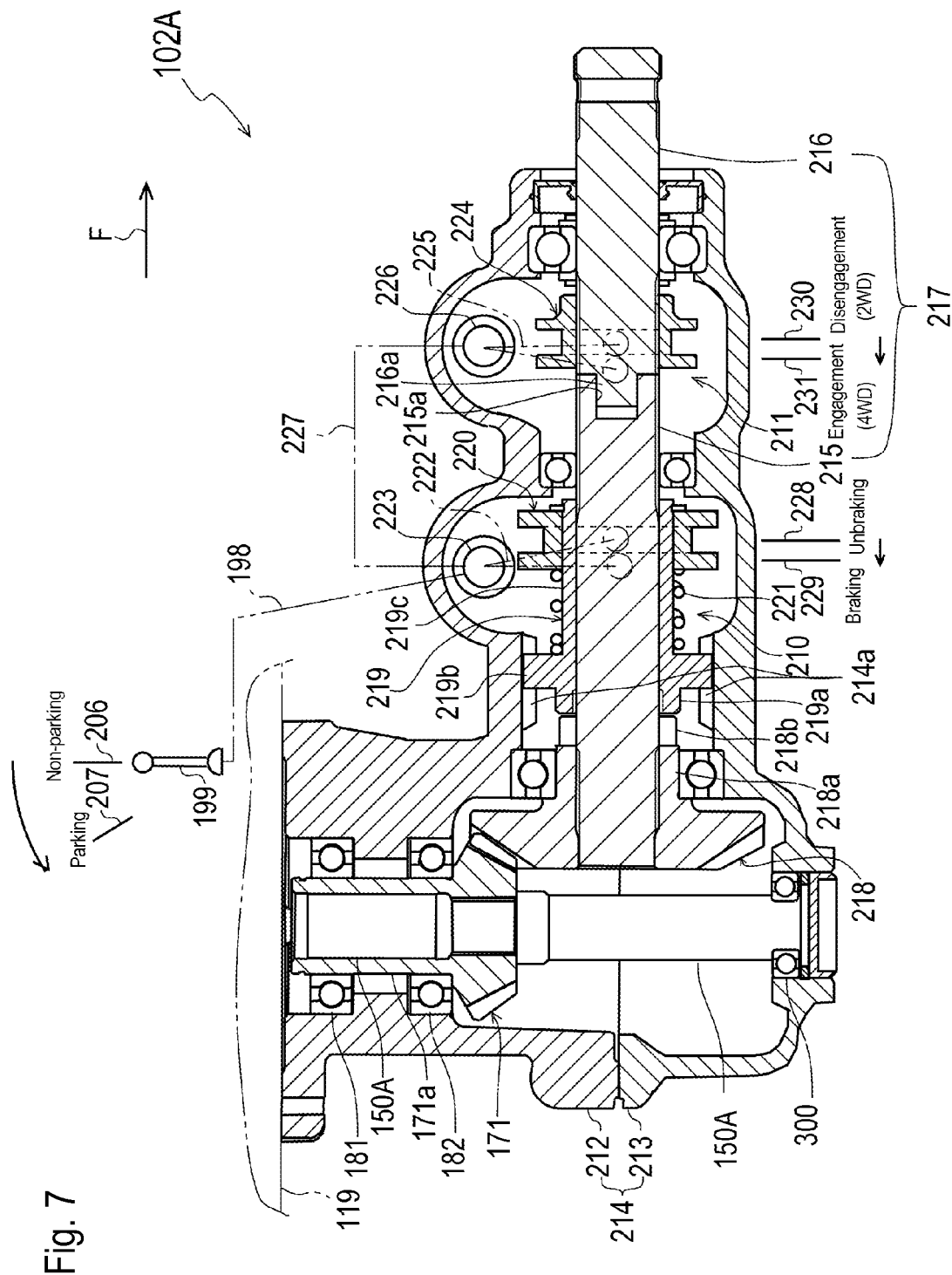
FIG. 7 is a sectional plan view of an alternative PTO unit 102A.

Referring to FIG. 7, a PTO unit 102A includes a parking brake 210 and a clutch 211 for switching the drive mode of vehicle 101 between a 2WD (two-wheel drive) mode and a 4WD (four-wheel drive) mode. Clutch 211 is interlockingly connected to parking brake 210 so as to enable parking brake 210 to brake the four wheels, i.e., front and rear wheels 115 and 116, of vehicle 101 traveling in the 2WD mode.

A proximal (in this embodiment, left) side housing 212 and a distal (in this embodiment, right) side housing 213 are joined to each other via a vertical joint plane so as to constitute a PTO casing 214 of PTO unit 102A. Proximal side housing 212 is bent in an L-shape in the plan view so as to have a forward extending portion and a lateral extending portion, similar to proximal side housing 129 of PTO casing 131 of PTO unit 102, excluding that the forward extending portion of proximal side housing 212 is longer than that of proximal side housing 129. Distal side housing 213 extends forward in correspondence to the long forward extending portion of proximal side housing 212. Therefore, PTO casing 214 formed in an L-shape in plan view by joining side housings 212 and 213 has a long forward extending portion incorporating parking brake 210 and clutch 211.

In this regard, rear transaxle 109 provided with PTO unit 102A has a reverser transmission shaft 150A journalled in transaxle casing 119 so as to serve as reverser transmission shaft 150 of reverser gear transmission 201. Reverser transmission shaft 150A projects from transaxle casing 119 into PTO casing 214 so as to be fixedly fitted into axial boss 171a of bevel gear 171 journalled by the lateral extending portion of proximal side housing 212 via bearings 181 and 182 similar to reverser transmission shaft 150, excluding that reverser transmission shaft 150A projects further distally (rightward) from bevel gear 171 so as to be journalled at a distal (right) end thereof by distal side housing 213 via a bearing 300 in comparison with reverser transmission shaft 150 disposed at the distal (right) end thereof in bevel gear 171. Therefore, in PTO casing 214, reverser transmission shaft 150A supporting bevel gear 171 is supported at three points by bearings 181, 182 and 300 so as to ensure stable rotation of bevel gear 171 drivingly connected to forwardly long PTO shaft 217 provided thereon with parking brake 210 and clutch 211.

PTO shaft 217 is divided into coaxial front and rear shaft parts. The rear shaft part serves as an upstream shaft part 215 of PTO shaft 217, and the front shaft part serves as a downstream shaft part 216 of PTO shaft 217. A bevel gear 218 is fixed on a rear end portion of upstream shaft part 215 adjacently forward of the distal portion of reverser transmission shaft 150A projecting from bevel gear 171, and meshes with bevel gear 171. Front downstream shaft part 216 projects forward from PTO casing 214 so as to be drivingly connected to front transaxle 110 (see FIG. 2).

Parking brake 210 uses bevel gear 218 fixed on upstream shaft part 215. In this regard, an axial boss 218a of bevel gear 218 is axially (fore-and-aft) extended on upstream shaft part 215 and is formed on a front end thereof with pawls serving as unslidable pawls 218b that is not slidable in the axial direction of PTO shaft 217. Parking brake 210 includes a shifter 219 that is axially slidably fitted on upstream shaft part 215 so as to allow upstream shaft part 215 to rotate relative to shifter 219. Shifter 219 is formed on a rear end thereof with pawls serving as slidable pawls 219a that is slidable axially of PTO shaft 217. Proximal and distal side housings 212 and 213 are formed with splines 214a on a rear inner peripheral portion of the forward extending portion of PTO casing 214. Shifter 219 is formed with a flange 219b whose outer peripheral edge is splined and is spline-fitted to splines 214a. Therefore, shifter 219 is slidable along upstream shaft part 215 unrotatably relative to PTO casing 214.

Shifter 219 is formed with an axial boss 219c axially extended on upstream shaft part 215. A fork engaging ring 220 is axially slidably fitted on axial boss 219c of shifter 219. A spring 221 is coiled on axial boss 219c of shifter 219 between flange 219b and fork engaging ring 220 so that shifter 219 is biased by spring 221 to have an original certain distance between flange 219b and fork engaging ring 220. A vertical parking operation shaft 223 is pivotally supported by proximal side housing 212 of PTO casing 214 so as to be rotatably centered on its own vertical axis. Parking operation shaft 223 is operatively connected to parking lever 199 outside PTO casing 214 and is operatively connected to a fork 222 (simply illustrated as phantom lines in FIG. 7) in PTO casing 214. Fork 222 engages with fork engaging ring 220 so that fork 222 is tilted by rotating parking operation shaft 223 to slide fork engaging ring 220 on axial boss 219c of shifter 219.

Parking operation shaft 223 may be divided into an outer shaft interlocking with parking lever 199 and an inner shaft interlocking with fork 222 so as to allow a differential rotation of the inner and outer shafts, similar to parking operation shaft 190 divided into outer and inner shafts 191 and 192. The same thing is said about parking operation shaft 223 used in a later-discussed PTO unit 102B. Further, parking operation shaft 223 may be provided with a detent system similar to detent unit 200.

FIG. 7 illustrates fork engaging ring 220 disposed at a position corresponding to non-parking position 206 of parking lever 199 and illustrates shifter 219 disposed at an unbraking position 228 where slidable pawls 219a disengage from unslidable pawls 218b of bevel gear 218. In this state, spring 221 keeps the original certain distance between flange 219b and fork engaging ring 220.

When parking lever 199 is rotated from non-parking position 206 to parking position 207, parking operation shaft 223 rotates to tilt fork 222 so as to rearwardly slide fork engaging ring 220 on axial boss 219c of shifter 219. Accordingly, spring 221 is compressed to reduce the distance between flange 219b and fork engaging ring 220, and keeps its compression state so as to keep the reduced distance between flange 219b and fork engaging ring 220, i.e., so as to keep the delay of main shaft 192 after the rotation of outer end shaft 191, before the recesses among unslidable pawls 218b coincide to respective slidable pawls 219a.

Once the recesses among unslidable pawls 218b coincide to respective slidable pawls 219a and slidable pawls 219a start being inserted into the recesses to engage with unslidable pawls 218b, spring 221 expands rearward to restore the original certain distance between flange 219b and fork engaging ring 220, thereby rearwardly pushing flange 219b so as to increase the insertion degree of slidable pawls 219a in the recesses among unslidable pawls 218b. Finally, shifter 219 reaches a braking position 229 where slidable pawls 219a completely engage with unslidable pawls 218b of bevel gear 218. Therefore, shifter 219 that is unrotatable relative to PTO casing 214 hinders bevel gear 218 from rotating together with upstream shaft part 215, thereby braking reverser transmission shaft 150A and thereby braking rear wheels 116 carried by rear transaxle 109.

On the contrary, when parking lever 199 is rotated from parking position 207 to non-parking position 206, fork engaging ring 220 slides forward on axial boss 219c of shifter 219, so that spring 221 repeats expansion to increase the distance between flange 219b and fork engaging ring 220 and compression for restoration to change the increased distance to the original certain distance. This restoring compression of spring 221 pulls flange 219b of shifter 219 forward, thereby sliding shifter 219 forward. Finally, shifter 219 reaches unbraking position 228 where slidable pawls 219a disengage with unslidable pawls 218b of bevel gear 218. Therefore, shifter 219 disengages from bevel gear 218 so as to allow upstream shaft part 215 to rotate together with bevel gear 218 following the rotation of reverser transmission shaft 150A.

Upstream shaft part 215 is splined on an outer peripheral surface of a front portion thereof, and downstream shaft part 216 is splined on an outer peripheral surface of a rear portion thereof in correspondence to the splined outer peripheral surface of upstream shaft part 215. Clutch 211 includes a clutch shifter 224 spline-fitted on the splined outer peripheral surface of downstream shaft part 216 of PTO shaft 217 so that clutch shifter 224 is axially slidable on downstream shaft part 216 unrotatably relative to downstream shaft part 216. Further, clutch shifter 224 can be spline-fitted on the splined outer peripheral surface of upstream shaft part 215 due to its slide rearward on downstream shaft part 216.

A vertical clutch operation shaft 226 is pivotally supported by proximal side housing 212 of PTO casing 214 so as to be rotatably centered on its own vertical axis. A fork 225 (simply illustrated as phantom lines in FIG. 7) is interposed between clutch operation shaft 226 and clutch shifter 224 so that fork 225 is tilted by rotating clutch operation shaft 226 so as to slide clutch shifter 224 on downstream shaft part 216 (and upstream shaft part 215). Therefore, clutch shifter 224 is shiftable between a disengagement position 230 serving as a 2WD position and an engagement position 231 serving as a 4WD position.

FIG. 7 illustrates clutch shifter 224 disposed at disengagement position 230. In this state, clutch shifter 224 spline-fitted on downstream shaft part 216 is not spline-fitted on upstream shaft part 215. This state of clutch shifter 224 is defined as the disengagement state of clutch 211 (clutch 211 is disengaged) for setting vehicle 101 in the 2WD mode. While clutch 211 is disengaged, downstream shaft part 216 is isolated from the rotation of upstream shaft part 215 following the rotation of reverser transmission shaft 150A. This state means that even if parking brake 210 is applied to brake upstream shaft part 215 so as to brake rear wheels 116, the braking effect of parking brake 210 is not applied to front wheels 115 carried by front transaxle 110.

On the other hand, when clutch shifter 224 is disposed at engagement position 231, clutch shifter 224 spline-fitted on downstream shaft part 216 is also spline-fitted on upstream shaft part 215. This state of clutch shifter 224 is defined as the engagement state of clutch 211 (clutch 211 is engaged) for setting vehicle 101 in the 4WD mode. If parking brake 210 is set to unbrake upstream shaft part 215 and upstream shaft part 215 rotates following reverser transmission shaft 150A, downstream shaft part 216 locked to upstream shaft part 215 via engaged clutch 211 receives the rotary power of upstream shaft part 215 following reverser transmission shaft 150A so as to transmit the rotary power to front transaxle 110, thereby driving all wheels 115 and 116 of vehicle 101. If parking brake 210 is set to brake upstream shaft part 215 so as to brake rear wheels 116 carried by rear transaxle 109, downstream shaft part 216 locked to upstream shaft part 215 via engaged clutch 211 receives the braking effect of parking brake 210 applied to upstream shaft part 215 so as to transmit the braking force to front transaxle 110 carrying front wheels 115, thereby braking front wheels 115 as well as rear wheels 116.

Clutch operation shaft 226 is linked with parking operation shaft 223 via a link 227 (simply illustrated as a phantom line in FIG. 7) so that when parking operation shaft 223 is rotated to shift shifter 219 from unbraking position 228 to braking position 229, clutch operation shaft 226 having been disposed to set clutch shifter 224 at disengagement position 230 (to set vehicle 101 in the 2WD mode) rotates following the rotation of parking operation shaft 223 so as to shift clutch shifter 224 to engagement position 231, thereby applying the braking force to four wheels 115 and 116 so as to surely park vehicle 101. Therefore, when parking lever 199 is shifted to parking position 20, clutch 211 is automatically engaged even if it has been disengaged, thereby setting vehicle 101 in the 4WD mode so as to ensure the stable parking of vehicle 101 with the braking force applied to four wheels 115 and 116.

Alternatively, one or both of parking operation shaft 223 and clutch operation shaft 226 may be supported by distal side housing 213 if the link of clutch operation shaft 226 with parking operation shaft 223 is ensured. Each of parking operation shaft 223 and clutch operation shaft 226 may be oriented in another direction than the vertical direction, e.g., in the lateral direction. The same things are said about shafts 223 and 226 used in later-discussed PTO units 102B and 102C.

Figure 8:
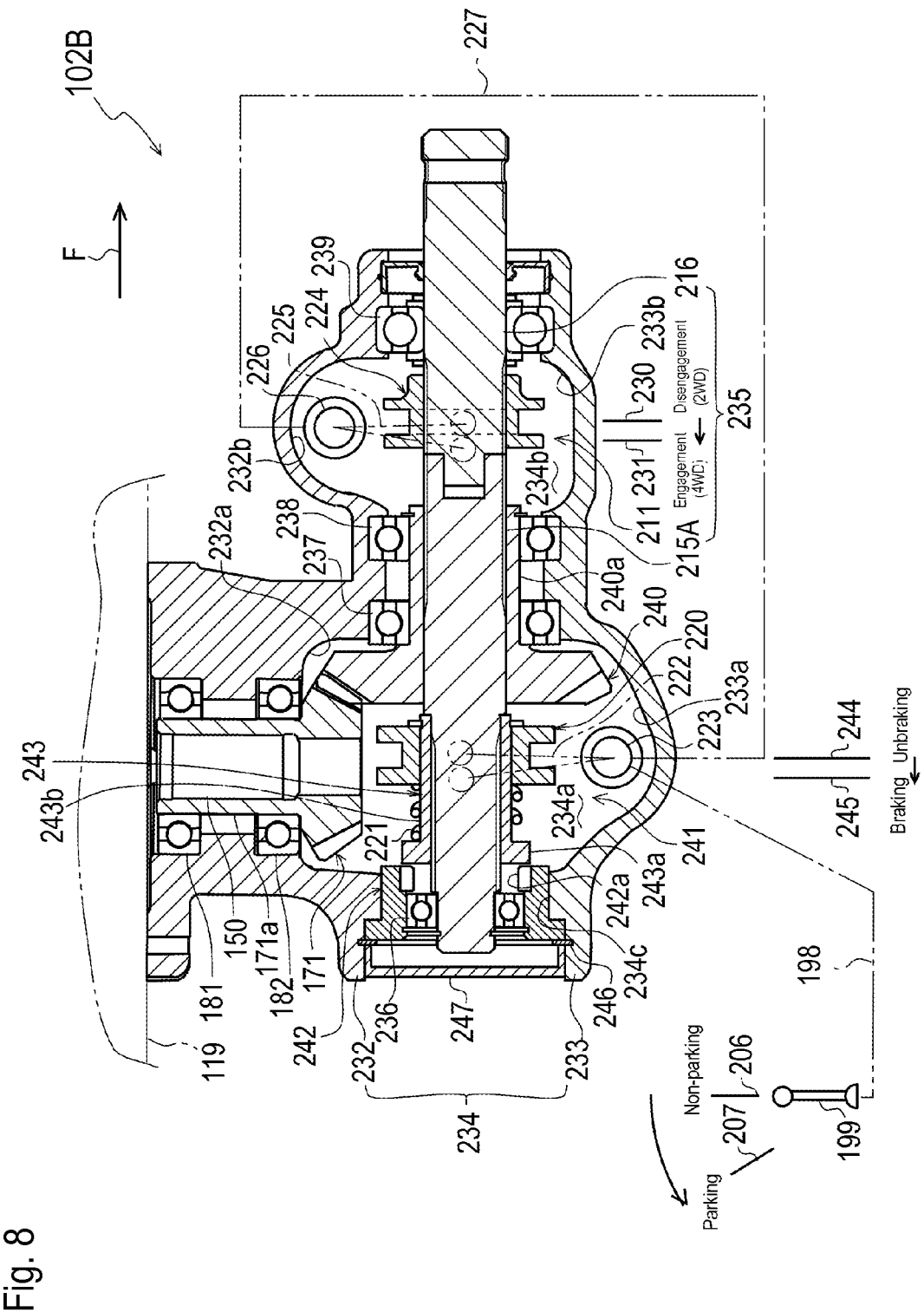
FIG. 8 is a sectional plan view of an alternative PTO unit 102B.

Referring to FIG. 8, a PTO unit 102B is advantageously shortened in the fore-and-aft direction while it incorporates both a parking brake 241 and clutch 211 in comparison with PTO unit 102A that is extended forward to incorporate both parking brake 210 and clutch 211. In this regard, an L-shaped proximal (in this embodiment, left) side housing 232 and a distal (in this embodiment, right) side housing 233 are joined to each other via a vertical joint plane so as to constitute an L-shaped PTO casing 234 of PTO unit 102B having a forward extending portion (of proximal and distal side housings 232 and 233), a lateral extending portion (of proximal side housing 232) and a bending portion (of proximal and distal side housings 232 and 233) between the forward extending portion and the lateral extending portion. While clutch 211 is disposed in the forward extending portion of PTO casing 234, parking brake 241 is disposed in the bending portion of PTO casing 234, thereby shortening the forward extending portion of PTO casing 234 in comparison with the forward extending portion of L-shaped PTO casing 214 of PTO unit 102A that is so long as to incorporate both parking brake 210 and clutch 211.

A PTO shaft 235 is journalled by proximal and distal side housings 232 and 233 via bearings. PTO casing 234 uses the bending portion and the forward extending portion to journal PTO shaft 235 in comparison with PTO casing 214 in which the forward extending portion is used to journal PTO shaft 217 however the bending portion is not used to journal PTO shaft 217 but is used to journal the distal (right) end potion of reverser transmission shaft 150A projecting distally (rightwardly) outward from bevel gear 171. In this regard, PTO unit 102B uses reverser transmission shaft 150 whose distal (right) end is disposed in axial boss 171a of bevel gear 171 journalled by the lateral extending portion of proximal side housing 232, thereby ensuring a space in the bending portion of L-shaped PTO casing 234 defined by bevel gear 171 and a bevel gear 240 provided on PTO shaft 235. This space serves as a later-discussed parking brake chamber 234a incorporating parking brake 241.

A rear upstream shaft part 215A and front downstream shaft part 216 are joined to each other coaxially and rotatably relative to each other so as to constitute PTO shaft 235. Rear upstream shaft part 215A is extended rearward on a distal (right) side of bevel gear 171 and is journalled at a rear end thereof by a rear end portion of PTO casing 234 via a bearing 236. Front downstream shaft part 216 is extended forward so as to be journalled by proximal and distal side housings 232 and 233 via a bearing 239 at a front end portion of PTO casing 234, and projects at a front end thereof forward from the front end portion of PTO casing 234.

Bevel gear 240 having an axial boss 240a is fixed on a front portion of upstream shaft part 215A so as to mesh with bevel gear 171. Axial boss 240a of bevel gear 240 is extended forward along upstream shaft part 215A and is journalled by proximal and distal side housings 232 and 233 at a fore-and-aft middle portion of PTO casing 234 via a rear bearing 237 and a front bearing 238. Bevel gear 240 divides the inner space of PTO casing 234 around PTO shaft 235 into rear parking brake chamber 234a and a front clutch chamber 234b. In other words, rear parking brake chamber 234a is provided between bearings 236 and 237, and front clutch chamber 234b is provided between bearings 238 and 239.

Parking brake 241 includes a fixture 242, a shifter 243 and fork engaging ring 220. Proximal and distal side housings 232 and 233 are formed with a rear opening 234c of PTO casing 234. Cylindrical fixture 242 is fixed to proximal and distal side housings 232 and 233 so as to be interposed between proximal and distal side housings 232 and 233 and bearing 236. In this regard, to facilitate access to parking brake 241 in parking brake chamber 234a for assembling or maintenance, rear opening 234c is diametrically stepped to have diametrically different front and rear portions so that the outwardly open rear portion of rear opening 234c is diametrically larger than the inwardly open front portion of rear opening 234c. Cylindrical fixture 242 is diametrically stepped correspondingly to the step of rear opening 234c. When fixture 242 is assembled in PTO casing 234, the step of fixture 242 is fitted to the step of rear opening 234c, thereby easily securely fitting fixture 242 to proximal and distal side housings 232 and 233 in rear opening 234c. A retaining ring 246 is fixed to proximal and distal side housings 232 and 233 in the rear portion of rear opening 234c so as to prevent fixture 242 from moving rearward, and a cap 247 is fitted into a rear end portion of rear opening 234c so as to cover the rear end of upstream shaft part 215A, bearing 236, fixture 242 and retaining ring 246 in rear opening 234c. To disassemble parking brake 241, cap 247 is removed to open rear opening 234c so that upstream shaft part 215A, fixture 242 and the like can be removed outward from PTO casing 234 via opened rear opening 234c.

Shifter 243 is a sleeve whose inner peripheral surface is splined and is spline-fitted on the outer peripheral surface of upstream shaft part 215A in parking brake chamber 234a so as to be axially slidable on upstream shaft part 215A unrotatably relative to upstream shaft part 215A. Fixture 242 is formed with unslidable pawls 242a on an inner peripheral surface of a front end portion thereof. A rear end portion of shifter 243 is flanged and slidable pawls 243a are formed on an outer peripheral surface of the flanged rear end portion of shifter 243 in correspondence to unslidable pawls 242a of fixture 242.

Fork engaging ring 220 is axially slidably fitted on shifter 243 so that shifter 243 is slidable relative to upstream shaft part 215A and fork engaging ring 220 is slidable relative to shifter 243. Spring 221 is coiled on shifter 243 between fork engaging ring 220 and the flanged rear end portion of shifter 243 with slidable pawls 243a so as to bias shifter 243 to keep an original certain distance between fork engaging ring 220 and the flanged rear end portion of shifter 243 with slidable pawls 243a. Vertical parking operation shaft 223 is pivotally supported by distal side housing 233 at a distal (right) side of fork engaging ring 220 laterally opposite bevel gear 171 so as to be operatively connected to parking lever 199 outside PTO casing 234 via link 198, and fork 222 is interposed between fork engaging ring 220 and parking operation shaft 223 in PTO casing 234.

Similar to spring 221 of parking brake 210 of PTO unit 102A, in response to the slide of fork engaging ring 220 according to the rotation of parking lever 199 between non-parking position 206 and parking position 207, spring 221 pushes or pulls shifter 243 so as to shift shifter 243 between an unbraking position 244 for disengaging slidable pawls 243a from unslidable pawls 242a and a braking position 245 for engaging slidable pawls 243a with unslidable pawls 242a. In this regard, spring 221 can keep its compression state to standby for engagement of slidable pawls 243a with unslidable pawls 242a before slidable pawls 243a coincide to the respective recesses among unslidable pawls 242a.

Clutch 211 is configured similar to that of PTO unit 102A. Clutch shifter 224 is shiftable between disengagement (2WD) position 230 for drivingly disconnecting downstream shaft part 216 from upstream shaft part 215A and engagement (4WD) position 231 for drivingly connecting downstream shaft part 216 to upstream shaft part 215A. Clutch operation shaft 226 is linked to parking operation shaft 223 so that clutch 211 is automatically engaged to set vehicle 101 in the 4WD mode when parking lever 199 is set at parking position 207 to apply parking brake 241 to upstream shaft part 215A of PTO shaft 235.

Figure 9:
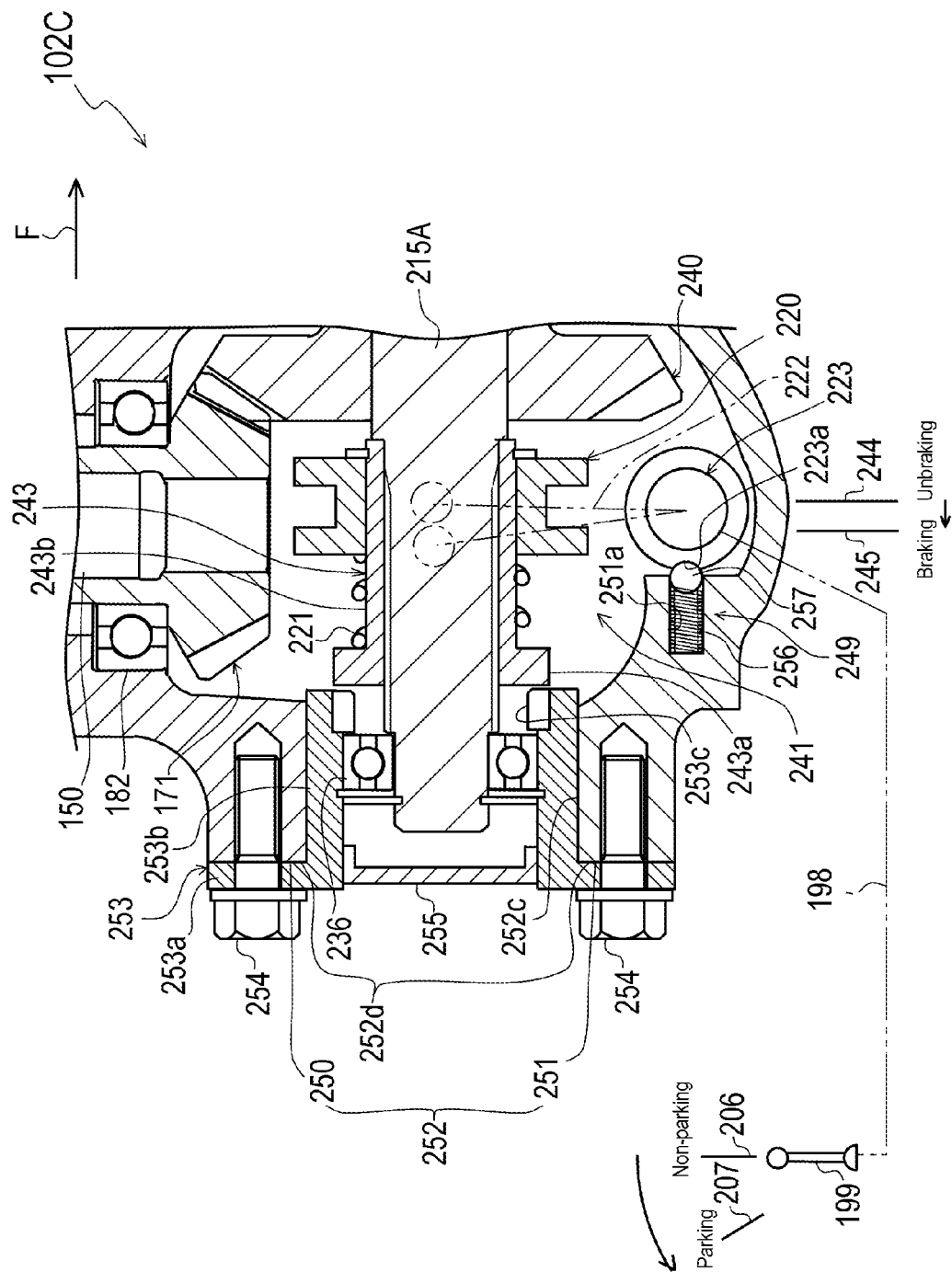
FIG. 9 is a fragmentary sectional plan view of an alternative PTO unit 102C.

Referring to FIG. 9, a PTO unit 102C is configured similar to PTO unit 102B. In this regard, a proximal (left) side housing 250 and a distal (right) side housing 251 are joined to each other via a vertical joint plane to constitute an L-shaped PTO casing 252 that has a rear parking brake chamber similar to parking brake chamber 234a at the bending portion of L-shaped PTO casing 252 and has a front clutch chamber similar to clutch chamber 234b at the forward extending portion of L-shaped PTO casing 252. PTO unit 102C employs PTO shaft 235 that includes coaxial rear upstream shaft part 215A and front downstream shaft part 216 journalled by proximal and distal side housings 250 and 251. Parking brake 241 is provided around upstream shaft part 215A, and clutch 211 is selectively engaged or disengaged so as to connect or disconnect downstream shaft part 216 to and from upstream shaft part 215A. The portion of PTO unit 102C provided with clutch 211 is omitted in FIG. 9.

The difference of PTO unit 102C from PTO unit 102B is the improvement of parking brake 241 by simplifying the fitting of a fixture 253 to PTO casing 252 and by providing parking operation shaft 223 with a detent unit 249. With regard to fixture 253, proximal and distal side housings 250 and 251 are formed with a rear opening 252c of PTO casing 252 between the parking brake chamber corresponding to parking brake chamber 234a and the rearward outside of PTO casing 252. Rear opening 252c has a constant diameter in all the range between the front and rear ends thereof in comparison with diametrically stepped rear opening 234c of PTO casing 234 of PTO unit 102B.

Fixture 253 has a cylindrical portion 253b whose diameter is even in all the range between the front and rear ends thereof, so that the outer peripheral surface of cylindrical portion 253b is fitted to the inner peripheral surface of rear opening 252c. A rear end of fixture 253 is formed with a flange 253a disposed rearwardly outward of PTO casing 252. Flange 253a is fitted to rear outside surfaces of proximal and distal side housings 250 and 251 and is fastened to proximal and distal side housings 250 and 251 by bolts 254, thereby fixing fixture 253 to PTO casing 252. In this way, the structure of PTO unit 102C to fit fixture 253 to PTO casing 252 is simplified in comparison with that of PTO unit 102B to fit fixture 242 to PTO casing 234 requiring fixture 242 and rear opening 242c to be stepped and to be provided with retaining ring 246.

The rear end of upstream shaft part 215A and bearing 236 fitted on the rear end of upstream shaft part 215A are fitted in the hollow of cylindrical portion 253b of fixture 253, and are covered by a cap 255 fitted into a rear portion of the hollow. Cylindrical portion 253b of fixture 253 is formed at a front end thereof with unslidable pawls 253c so as to face slidable pawls 243a of shifter 243 spline-fitted on upstream shaft part 215A in the parking brake chamber.

A fore-and-aft cylindrical detent recess 251a is formed in a wall of distal side housing 251 so as to have a closed rear end and so as to have a front end open to face vertical parking operation shaft 223 supported by distal side housing 251. Detent unit 249 includes a detent spring 256 and a detent ball 257. Parking operation shaft 223 is formed on the outer peripheral surface thereof with respective hemisphere detent recesses 223a (in FIG. 9, only representative recess 223a is illustrated) corresponding to non-parking position 206 and parking position 207 of parking lever 199. Detent spring 256 biases detent ball 257 forward so as to enable detent ball 257 to be fitted into each detent recess 223a. By rotating parking operation shaft 223 to a position corresponding to either non-parking position 206 or parking position 207, corresponding detent recess 223a comes to receive detent ball 257 so as to stop parking operation shaft 223 at the corresponding detent rotational position, thereby stopping shifter 243 at unbraking position 244 or braking position 245.

Referring to FIGS. 10 and 11A-11D, a PTO unit 102D advantageously uses a clutch-brake unit 263 serving as both the parking brake and the clutch for switching the drive mode of vehicle 101 in comparison with aforesaid PTO units 102A, 102B and 102C each of which is provided with parking brake 210 or 241 and clutch 211 separated from each other.

A proximal side housing 259 and a distal side housing 260 are joined to each other via a vertical joint plane so as to constitute a PTO casing 261 of PTO unit 102D that is bent in an L-shape in plan view so as to have a lateral extending portion, a forward extending portion and a bending portion between the lateral extending portion and the forward extending portion, similar to aforesaid PTO casings 131, 214, 234 and 252. In this regard, proximal side housing 259 is joined to transaxle casing 119 so as to define the lateral position of PTO casing 261. Rear transaxle 109 provided with PTO unit 102D employs reverser transmission shaft 150 whose distal end is disposed in axial boss 171a of bevel gear 171 journalled via bearings 181 and 182 in proximal side housing 259. On the other hand, proximal and distal side housings 259 and 260 are joined to each other so as to define the forward extending portion of PTO casing 261 journaling a PTO shaft 262 and incorporating clutch-brake unit 263.

PTO shaft 262 includes a rear upstream shaft part 215B and front downstream shaft part 216 that are joined to each other coaxially and rotatably relative to each other. Bevel gear 218 is fixed on upstream shaft part 215B to mesh with bevel gear 171. Upstream shaft part 215B is extended in the bending portion of PTO casing 261 rearward from bevel gear 218 and is journalled at a rear end thereof by proximal and distal side housings 259 and 260 via a bearing 301 at a rear end of PTO casing 261.

Clutch-brake unit 263 s a fixture 264 and a clutch-brake shifter 265. Upstream shaft part 215B is extended forward from bevel gear 218 and is splined on the outer peripheral surface of the front portion thereof extended forward from bevel gear 218. Fixture 264 is a ring-shaped member disposed around the front portion of upstream shaft part 215B extended forward from bevel gear 218. Ring-shaped fixture 264 is fixed at the outer peripheral edge thereof to proximal and distal side housings 259 and 260 and is formed on the inner peripheral edge thereof with unslidable pawls 264a facing the splined outer peripheral surface of the front portion of upstream shaft part 215B. Downstream shaft part 216 projects forward from a front end of PTO casing 261 defined by proximal and distal side housings 259 and 260 so as to be drivingly connected to front transaxle 110. In the forward extending portion of PTO casing 261, a rear portion of downstream shaft part 216 is splined on the outer peripheral surface thereof so as to correspond to the splined outer peripheral surface of the front portion of upstream shaft part 215B.

Clutch-brake shifter 265 is spline-fitted on the splined outer peripheral surface of the rear portion of downstream shaft part 216 so as to be axially slidable on downstream shaft part 216 unrotatably relative to downstream shaft part 216. If clutch-brake shifter 265 slides rearward, clutch-brake shifter 265 can also be spline-fitted at a rear portion thereof on the splined outer peripheral surface of the front portion of upstream shaft part 215B. Therefore, clutch-brake shifter 265 and upstream and downstream shaft parts 215B and 216 of PTO shaft 262 constitute a clutch 263a of clutch-brake unit 263. The state of clutch-brake shifter 265 spline-fitted on both upstream and downstream shaft parts 215B and 216 is defined as the engagement state of clutch 263a, and the state of clutch-brake shifter 265 spline-fitted on only downstream shaft part 216 is defined as the disengagement state of clutch 263a.

A rear end of clutch-brake shifter 265 is flanged, and the rear end flange of clutch-brake shifter 265 is formed with slidable pawls 265a on the outer peripheral edge thereof in correspondence to unslidable pawls 264a of fixture 264. Therefore, fixture 264 formed with unslidable pawls 264a and clutch-brake shifter 265 formed with slidable pawls 265a constitute parking brake 263b of clutch-brake unit 263. The engagement state of slidable pawls 265a of clutch-brake shifter 265 with unslidable pawls 264a of fixture 264 is defined as the braking state of parking brake 263b, where fixture 264 fixed to PTO casing 261 hinders clutch-brake shifter 265 from rotating relative to fixture 264, thereby hindering upstream shaft part 215B spline-fitted to clutch-brake shifter 265 from rotating relative to fixture 264, i.e., PTO casing 261. The disengagement state of slidable pawls 265a of clutch-brake shifter 265 from unslidable pawls 264a of fixture 264 is defined as the unbraking state of parking brake 263b, where upstream shaft part 215B is rotatably free from fixture 264 fixed to PTO casing 261 even if upstream shaft part 215B is spline-fitted to clutch-brake shifter 265.

In this regard, as discussed later, clutch-brake shifter 265 is constantly spline-fitted to downstream shaft part 216 in all the range for sliding of clutch-brake shifter 265, and the braking state of parking brake 263b is realized when clutch-brake shifter 265 reaches a rear end position of its slide range so as to be also spline-fitted at the rear portion thereof on upstream shaft part 215B, i.e., in the engagement state of clutch 263a for setting vehicle 101 in the 4WD mode. On the contrary, the disengagement state of clutch 263a for setting vehicle 101 in the 2WD mode is realized when clutch-brake shifter 265 reaches a front end position of its slide range so as to disengage from fixture 264, i.e., in the unbraking state of parking brake 263b. Therefore, the braking state of parking brake 263b can be realized only if clutch 263a is engaged to set vehicle 101 in the 4WD mode.

Figure 10:
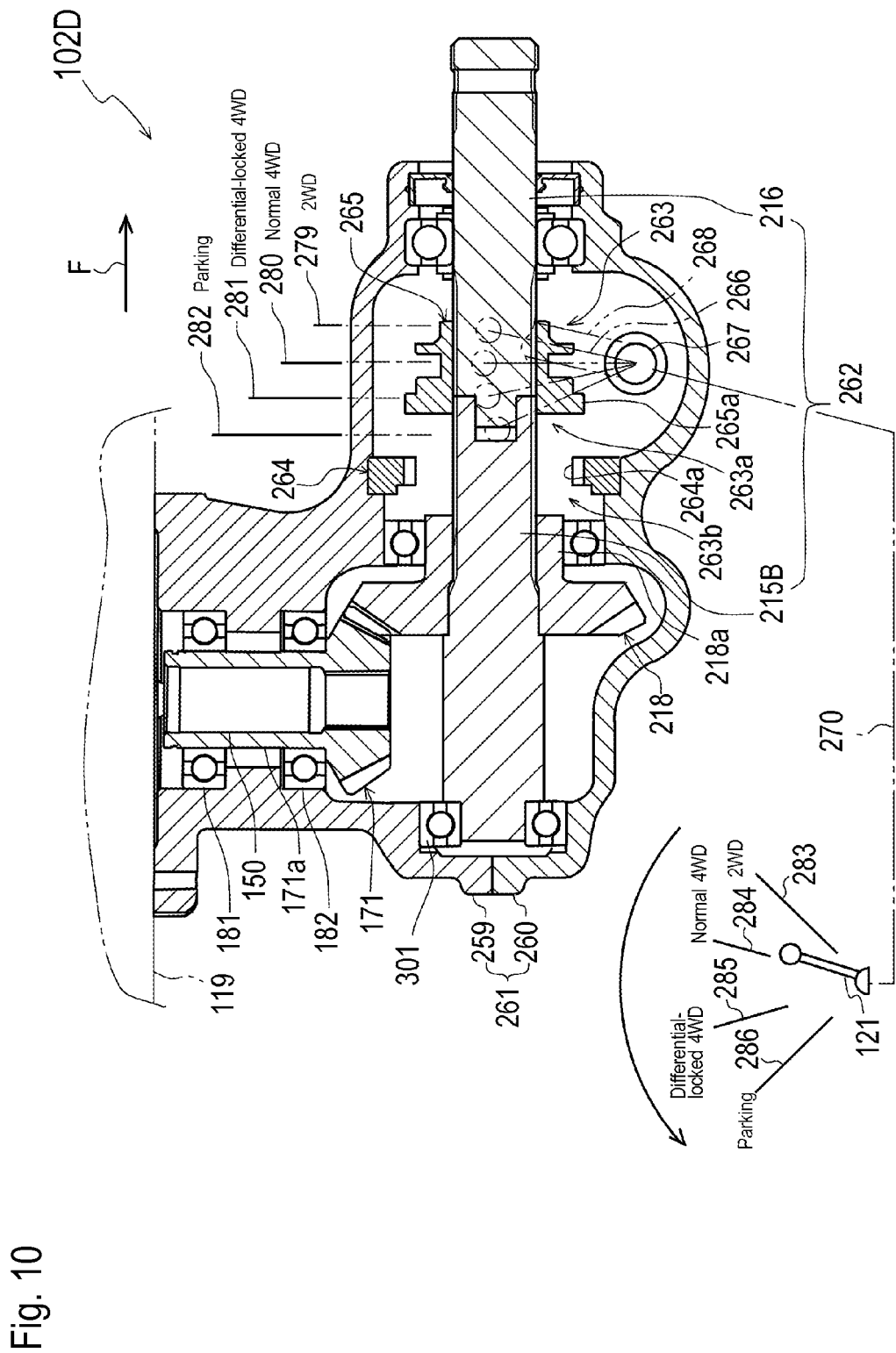
FIG. 10 is a sectional plan view of an alternative PTO unit 102D.

Referring to FIG. 10, the front end position of the slide range of clutch-brake shifter 265 is defined as a 2WD mode position 279 where clutch 263a is disengaged and parking brake 263b is set in the unbraking state. The rear end position of slide range of clutch-brake shifter 265 is defined as a parking mode position 282 where clutch 263a is engaged and parking brake 263b is set in the braking state. Further, clutch-brake shifter 265 is associated with differential locker 167 (see FIG. 2) as discussed later. In this regard, 2WD mode position 279 of clutch-brake shifter 265 is defined to set differential locking slider 169 of differential locker 167 at the unlocking position, i.e., to set differential locker 167 in the unlocking state, and parking mode position 282 of clutch-brake shifter 265 is defined to set differential locking slider 169 of differential locker 167 at the locking position, i.e., to set differential locker 167 in the locking state.

Further, two positions are defined in the slide range of clutch-brake shifter 265 between 2WD mode position 279 and parking mode position 282. One position closer to 2WD mode position 279 is defined as a normal 4WD mode position 280 where clutch 263a is engaged, parking brake 263b is set in the unbraking state, and differential locker 167 is set in the unlocking state. The other position closer to parking mode position 282 is defined as a differential-locked 4WD mode position 281 where clutch 263a is engaged, parking brake 263b is set in the unbraking state, and differential locker 167 is set in the locking state.

A vertical clutch-brake operation shaft 267 is pivotally supported by distal mode housing 260. In PTO casing 261, a fork 266 (simply illustrated as phantom lines in FIG. 10) is interposed between clutch-brake operation shaft 267 and clutch-brake shifter 265 so that fork 266 is tilted by rotating clutch-brake operation shaft 267 so as to slide clutch-brake shifter 265 on PTO shaft 262. Clutch-brake operation shaft 267 is operatively connected to a mode selection lever 121 outside PTO casing 261 via a link 270. Further, an operation arm 268 is provided on clutch-brake operation shaft 267 outside PTO casing 261 so as to operatively connect clutch-brake operation shaft 267 to differential locker 167 (see FIGS. 11A-11D).

Clutch-brake operation shaft 267 may be divided into coaxial and differentially rotatable shafts for the same purpose as parking operation shaft 190. Clutch-brake operation shaft 267 may be provided with a detent system for defining detent positions corresponding to the four positions 279, 280, 281 and 282 of clutch-brake shifter 265. Alternatively, clutch-brake operation shaft 267 may be supported by distal side housing 259. Alternatively, clutch-brake operation shaft 267 may be oriented in another direction other than the vertical direction, e.g., in the lateral direction.

Vehicle 101 equipped with PTO unit 102D is provided with mode selection lever 121 serving as a manipulator for setting vehicle 101 in one of four modes, i.e., the 2WD mode, the normal 4WD mode, the differential-locked 4WD mode, and the parking mode. Mode selection lever 121 is shiftable among a 2WD mode position 283, a normal 4WD mode position 284, differential-locked 4WD mode position 285 and parking mode position 286. Due to the above-mentioned operative connection of mode selection lever 121 to clutch-brake shifter 265 via link 270, clutch-brake operation shaft 267 and fork 266, 2WD mode position 279 of clutch-brake shifter 265 corresponds to 2WD mode position 283 of mode selection lever 121, normal 4WD mode position 280 to normal 4WD mode position 284, differential-locked 4WD mode position 281 to differential-locked 4WD mode position 285, and parking mode position 282 to parking mode position 286.

Referring to FIGS. 11A-11D, vehicle 101 is provided with a linkage 114 linking differential locker 167 to clutch-brake shifter 265 of clutch-brake unit 263. Incidentally, linkage 114 is provided outside PTO casing 261 incorporating clutch-brake unit 263, however, each of FIGS. 11A-11D illustrates clutch-brake unit 263 in the fragmentary sectional view of PTO casing 261 appearing as overlapping linkage 114.

Linkage 114 includes first operation arm 268, a second operation arm 269, a spring 272, cables (or wires) 273 and 274, a slot member 275 and a spring 276. First operation arm 268 is fixed on clutch-brake operation shaft 267. Transaxle casing 119 pivotally supports a differential locker operation shaft 271 whose rotation causes the shift of differential locking slider 169 of differential locker 167 between the unlocking position and the locking position. Second operation arm 269 is fixed on differential locker operation shaft 271 outside transaxle casing 119. Incidentally, each of shafts 267 and 271 may be divided into the coaxial and differentially rotatable shafts so as to allow clutch-brake shifter 265 or differential locking slider 169 to deviate from the position directly corresponding to the set position of shaft 267 or 271, however, in convenience for description, operation arms 268 and 269 are described as being fixed on respective shafts 267 and 271 because the set positions of clutch-brake shifter 265, shaft 267 and first operation arm 268 finally correspond to each other, and the set positions of differential locking slider 169, shaft 271 and second operation arm 269 finally correspond to each other.

A slide pin 268a is fixed on a tip of first operation arm 268 and is slidably fitted in a slot 275a formed in slot member 275. Cable 273 is extended from slot member 275 toward second operation arm 269. Second operation arm 269 is shiftable between an unlocking position 277 and a locking position 278. Spring 272 biases second operation arm 269 to unlocking position 277 so that second operation arm 269 is normally set at unlocking position 277 corresponding to the unlocking position of differential locking slider 169. On the other hand, cable 274 is extended from a tip of second operation arm 269 toward first operation arm 268. Spring 272 is interposed between cables 273 and 274. In this regard, for the convenience of illustration in FIGS. 11A-11D, it is assumed that slot member 275, cable 273, spring 272 and cable 274 are extended in this order forward from first operation arm 268 to second operation arm 269, unlocking position 277 of second operation arm 269 is disposed forward from locking position 278 of second operation arm 269, and spring 276 biases second operation arm 269 forward to unlocking position 277.

The normal 4WD mode state of linkage 114 shown in FIG. 11B will be described as the beginning of description of the states of linkage 114 illustrated in FIGS. 11A-11D. In this state, clutch-brake shifter 265 is disposed at normal 4WD mode position 280. First operation arm 268 set to correspond to normal 4WD mode position 280 of clutch-brake shifter 265 has slide pin 268a in a rear end of slot 275a. Second operation arm 269 is set at unlocking position 277 as biased by spring 276, and spring 272 is compressed by its own spring force so as to have its minimum length.

Referring to FIG. 11A, if clutch-brake shifter 265 moves forward from normal 4WD mode position 280 to 2WD mode position 279, the tip of first operation arm 268 moves forward to correspond to the movement of clutch-brake shifter 265. However, the tip of second operation arm 269 cannot move forward from unlocking position 277 as the front limit position of the rotation range of second operation arm 269, and spring 272 cannot be further compressed. Therefore, slot member 275 is kept at the position shown in FIG. 11B, and slide pin 268a slides from the rear end of slot 275a to a front end of slot 275a so that slot 275a of slot member 275 allows the forward movement of the tip of first operation arm 268, thereby realizing the 2WD mode state of linkage 114 ensuring that first operation arm 268 disposed in correspondence to clutch-brake shifter 265 at 2WD mode position 279 is linked with second operation arm 269 set at unlocking position 277.

Conversely, in the 2WD mode state of linkage 114, slot 275a allows the rearward movement of slide pin 268a from its front end to its rear end so as to allow the rearward movement of the tip of first operation arm 268 to move clutch-brake shifter 265 to normal 4WD mode position 280 shown in FIG. 11B while keeping the compressed state of spring 272 and keeping second operation arm 269 at unlocking position 277. Therefore, by shifting clutch-brake shifter 265 from 2WD mode position 279 to normal 4WD mode position 280, linkage 114 is set in the normal 4WD mode state so as to ensure that first operation arm 268 disposed in correspondence to clutch-brake shifter 265 at normal 4WD mode position 280 is linked with second operation arm 269 set at unlocking position 277.

Referring to FIG. 11C, when clutch-brake shifter 265 moves rearward from normal 4WD mode position 280 to differential-locked 4WD mode position 281, the tip of first operation arm 268 moves rearward to its position corresponding to differential-locked 4WD mode position 281 of clutch-brake shifter 265 so as to pull slot member 275 rearward because slide pin 268a of first operation arm 268 disposed in correspondence to clutch-brake shifter 265 at normal 4WD mode position 280 has reached the rear end of slot 275a. Cable 273 moves rearward together with slot member 275. In this regard, the compression force of spring 272 exceeds the biasing force of spring 276 for keeping second operation arm 269 at unlocking position 277. Therefore, spring 272 while being compressed moves rearward to follow cable 273 so as to pull second operation arm 269 to locking position 278 via cable 274 against the biasing force of spring 276, thereby realizing the differential-locked 4WD mode state of linkage 114 ensuring that first operation arm 268 disposed correspondence to clutch-brake shifter 265 at differential-locked 4WD mode position 281 is linked with second operation arm 269 set at locking position 278.

Conversely, when clutch-brake shifter 265 moves forward from differential-locked 4WD mode position 281 to normal 4WD mode position 280, first operation arm 268 rotates forward and spring 276 is released from the compression force of spring 272, whereby spring 276 pulls second operation arm 269 forward to unlocking position 277 and also forwardly pulls cables 273 and 274, compressed spring 272 and slot member 275 having slide pin 268a in the rear end of slot 275a, thereby realizing the normal 4WD mode state of linkage 114.

Referring to FIG. 11D, when clutch-brake shifter 265 moves rearward from differential-locked 4WD mode position 281 to parking mode position 282, the tip of first operation arm 268 moves rearward to its position corresponding to parking mode position 282 of clutch-brake shifter 265 so as to pull slot member 275 rearward because slide pin 268a of first operation arm 268 disposed in correspondence to clutch-brake shifter 265 at differential-locked 4WD mode position 281 is disposed at the rear end of slot 275a. Cable 273 moves rearward together with slot member 275. However, second operation arm 269 cannot rotate rearward from locking position 278 as the rear limit position of its rotation range. Therefore, spring 272 is expanded to increase its length so as to cover the increased gap between rearwardly moving cable 273 and cable 274 connected to second operation arm 269 held at locking position 278, thereby realizing the parking mode state of linkage 114 ensuring that first operation arm 268 disposed in correspondence to clutch-brake shifter 265 at parking mode position 282 is linked with second operation arm 269 set at locking position 278.

Conversely, when clutch-brake shifter 265 moves forward from parking mode position 282 to differential-locked 4WD mode position 281, first operation arm 268 rotates forward and spring 272 having been expanded restores its compressed state so as to allow the forward movement of first operation arm 268, slot member 275 and cable 273 while keeping second operation arm 269 at locking position 278 against the biasing force of spring 276, thereby realizing the differential-locked 4WD mode state of linkage 114.

As mentioned above, clutch-brake unit 263 including fixture 264 and clutch-brake shifter 265 functions as both clutch 263a and parking brake 263b, thereby simplifying PTO unit 102D and reducing the number of component parts. Further, due to linkage 114 linking clutch-brake unit 263 with differential locker 167, the only shifting operation of mode selection lever 121 among the four positions 283-286 enables an operator to easily select any one of the above-mentioned four modes so as to realize the best states of clutch 263a, parking brake 263b and differential locker 167 in correspondence to the real traveling state of vehicle 101.

It is further understood by those skilled in the art that the foregoing description is a preferred embodiment of the disclosed apparatus and that various changes and modifications may be made in the invention without departing from the scope thereof defined by the following claims.

What is claimed is:

1. A power take-off unit adapted to take-off power from a transmission for driving first drive wheels of a vehicle and to transmit the taken-off power to second drive wheels of the vehicle, the power take-off unit comprising:
   a power take-off casing mounted directly on another casing incorporating the transmission;
   a power take-off shaft journalled by the power take-off casing, drivingly connected to a transmission shaft of the transmission and drivingly connected to the second drive wheel; and
   a brake disposed in the power take-off casing,
   wherein the brake includes an unslidable pawl that is fixed to the power take-off casing so as to be unslidable in the axial direction of the power take-off shaft, and
   wherein the brake includes a slidable pawl that is slidable axially in the axial direction of the power take-off shaft so as to be shiftable between a braking position where the slidable pawl engages with the unslidable pawl so as to brake the power take-off shaft and an unbraking position where the slidable pawl disengages from the unslidable pawl so as to unbrake the power take-off shaft,
   wherein when the slidable pawl engages with the unslidable pawl the brake applies braking force to both the first drive wheel and the second drive wheel.

2. The power take-off unit according to claim 1,
   wherein the power take-off shaft includes an upstream shaft part and a downstream shaft part,
   wherein the power take-off unit further comprises a clutch interposed between the upstream and downstream shaft parts so that the clutch is selectively engaged for drivingly connecting the upstream shaft part to the downstream shaft part or disengaged for isolating the downstream shaft part from a rotary power of the upstream shaft part, and
   wherein the brake is configured to brake the upstream shaft part when the slidable pawl is disposed at the braking position.

3. The power take-off unit according to claim 2,
   wherein the clutch and the brake are configured so that the clutch is engaged when the slidable pawl of the brake is disposed at the braking position.

4. The power take-off unit according to claim 2,
   wherein at least one of the first and second drive wheels is paired and a differential unit differentially connects the pair of first or second drive wheels to each other, and
   wherein the differential unit is provided with a differential locker that is shiftable between a locking state to differentially integrate the pair of first or second drive wheels with each other and an unlocking state to allow differential rotation of the pair of first or second drive wheels.

5. The power take-off unit according to claim 4,
   wherein the clutch and the differential locker are configured so that the clutch is engaged when the differential locker is set in the locking state.

6. The power take-off unit according to claim 4,
   wherein the clutch, the differential locker and the brake are configured so that the clutch is engaged and the differential locker is set in the locking state when the slidable pawl of the brake is disposed at the braking position.

7. The power take-off unit according to claim 4, further comprising:
   a shifter axially slidably provided on the power take-off shaft and operatively connected to a mode selection lever for selecting one of a two-wheel drive mode, a normal four-wheel drive mode, a differential-locked four-wheel drive mode and a parking mode,
   wherein the shifter serves as the clutch for engaging and disengaging the upstream and downstream shaft parts to and from each other, and is provided with the slidable pawl of the brake, and is operatively connected to the differential locker,
   wherein when the mode selection lever is manipulated to select the two-wheel drive mode, the shifter is disposed at a first slide position so that the slidable pawl of the brake is disposed at the unbraking position, the differential locker is set in the unlocking state and the clutch is disengaged,
   wherein when the mode selection lever is manipulated to select the normal four-wheel drive mode, the shifter is disposed at a second slide position so that the slidable pawl of the brake is disposed at the unbraking position, the differential locker is disposed at the unlocking position and the clutch is engaged,
   wherein when the mode selection lever is manipulated to select the differential-locked four-wheel drive mode, the shifter is disposed at a third slide position so that the slidable pawl of the brake is disposed at the unbraking position, the differential locker is set in the locking state and the clutch is engaged, and
   wherein when the mode selection lever is manipulated to select the parking mode, the shifter is disposed at a fourth slide position so that the slidable pawl of the brake is disposed at the braking position, the differential locker is set in the locking state and the clutch is engaged.

8. The power take-off unit according to claim 1, further comprising:

a shifter including the slidable pawl of the brake, the shifter being axially slidable along the power take-off shaft so as to be shiftable among a first, second, third, and fourth position, wherein the shifter is operatively connected to a mode selection lever so that the first position corresponds to a two-wheel drive position, the second position corresponds to a normal four-wheel drive position, the third position corresponds to a differentially-locked four-wheel drive position, and the fourth position corresponds to a parking position, wherein the shifter disposed at the first position serves as a clutch disengaged to separate an upstream shaft part from a downstream shaft part, wherein the shifter disposed at the second, third or fourth position serves as the clutch engaged to drivingly connect the downstream shaft part to the upstream shaft part, wherein the shifter disposed at the first, second or third position serves as the slidable pawl of the brake disposed at the unbraking position such as to disengage from the unslidable pawl fixed to the power take-off casing, and wherein the shifter disposed at the fourth position serves as the slidable pawl of the brake disposed at the braking position such as to engage with the unslidable pawl.

9. The power take-off unit according to claim 8, further comprising:

a first operation member interlockingly connecting the mode selection lever to the shifter, the first operation member being movable according to a shift of the mode selection lever;

a second operation member interlockingly connected to a differential locker, wherein the second operation member is shiftable between a locking position corresponding to the locking position of the differential locker and an unlocking position corresponding to the unlocking position of the differential locker;

a biasing member biasing the second operation member to the unlocking position of the second operation member;

a link including a first end portion connected to the first operation member, and a second end portion connected to the second operation member, wherein the first end portion of the link includes a space having first and second ends defining a range for moving the first operation member relative to the link; and an elastic member provided at an intermediate portion of the link, wherein the elastic member is shiftable between a normal state, such as to set a length of the link between the first and second end portions of the link at a normal length, and an expanded state, such as to set the length of the link at an increased length that is greater than the normal length, wherein the power take-off unit is configured so that:

during a shift of the shifter between the first and second positions, the first operating member moves relative to the link between the first and second ends of the space in the first end portion of the link while the link is kept to have the elastic member in the normal state and to have the second operation member held at the unlocking position by the biasing member;

during a shift of the shifter between the second and third positions, the first operating member disposed at the second end of the space in the first end portion of the link moves together with the link so as to move the second operation member between the unlocking position and the locking position while the link is kept to have the elastic member in the normal state; and during a shift of the shifter between the third and fourth positions, the first operating member disposed at the second end of the space in the first end portion of the link moves together with the link so as to shift the elastic member between the normal state and the expanded state and so as to hold the second operation member at the locking position against a biasing force of the biasing member.

\* \* \* \* \*